(12) United States Patent
Asam et al.

(10) Patent No.: US 11,223,278 B2
(45) Date of Patent: Jan. 11, 2022

(54) VOLTAGE SUPPLY CIRCUITRY WITH CHARGE PUMP MODE AND BOOST CONVERTER MODE

(71) Applicant: Infineon Technologies AG, Neubiberg (DE)

(72) Inventors: Michael Asam, Inchenhofen-Sainbach (DE); Mihai-Alexandru Ionescu, Graefelfing (DE); Ardit Tabaku, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 35 days.

(21) Appl. No.: 16/809,350

(22) Filed: Mar. 4, 2020

(65) Prior Publication Data

US 2021/0281170 A1    Sep. 9, 2021

(51) Int. Cl.
*H02M 3/07* (2006.01)
*H02M 3/158* (2006.01)
*H02M 1/00* (2006.01)

(52) U.S. Cl.
CPC ............. *H02M 3/07* (2013.01); *H02M 3/158* (2013.01); *H02M 1/0009* (2021.05)

(58) Field of Classification Search
CPC ....... H02M 1/0095; H02M 3/07; H02M 3/158
See application file for complete search history.

(56) References Cited

U.S. PATENT DOCUMENTS

| 5,339,236 A | * | 8/1994 | Tamagawa | H02M 3/07 363/59 |
|---|---|---|---|---|
| 2005/0047181 A1 | * | 3/2005 | Yamamoto | H02M 3/07 363/60 |
| 2005/0219878 A1 | * | 10/2005 | Ito | H02M 3/07 363/59 |
| 2007/0018614 A1 | * | 1/2007 | Effing | H02M 3/073 320/140 |
| 2012/0249103 A1 | | 10/2012 | Latham, II et al. | |
| 2013/0057530 A1 | | 3/2013 | Han et al. | |
| 2017/0244318 A1 | | 8/2017 | Giuliano | |
| 2018/0074564 A1 | | 3/2018 | Paparrizos et al. | |
| 2018/0166984 A1 | * | 6/2018 | McIntosh | H02M 1/08 |
| 2018/0205315 A1 | * | 7/2018 | Giuliano | H02M 3/158 |
| 2019/0312514 A1 | * | 10/2019 | Hukel | H02M 3/07 |

* cited by examiner

*Primary Examiner* — Alex Torres-Rivera
(74) *Attorney, Agent, or Firm* — Shumaker & Sieffert, P.A.

(57) ABSTRACT

Voltage supply circuitry includes a high-side pin and a low-side pin configured to couple to a storage element and an output pin. The voltage supply further includes a high-side switching element configured to electrically couple the positive supply pin and the low-side pin based on a high-side control signal and a low-side switching element configured to electrically couple the reference supply pin and the low-side pin based on a low-side control signal. The voltage supply further including driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

20 Claims, 16 Drawing Sheets

VOLTAGE SUPPLY CIRCUITRY WITH CHARGE PUMP MODE AND BOOST CONVERTER MODE

TECHNICAL FIELD

This disclosure relates to techniques for voltage supply circuitry.

BACKGROUND

Voltage supply circuitry may be used to output a voltage that is different from a received voltage. In some applications, a boost converter may convert a received voltage of 3 volts into an output voltage of at least 13 volts. In other applications, a charge pump may convert a received voltage of 20 volts into an output voltage of at least 30 volts. To support different applications, a designer may select a first circuit to implement the boost converter for some applications and selection first circuit to implement the charge pump in other applications.

SUMMARY

In general, this disclosure is directed to techniques for implementing voltage supply circuitry configured to operate in a charge pump mode and a boost converter mode. For example, the voltage supply circuitry may include driver circuitry configured to generate a high-side control signal and a low-side control signal for operating in a charge pump mode when a storage element is arranged in a charge pump configuration and to generate the high-side control signal and the low-side control signal for operating in a boost converter mode when the storage element is arranged in a boost converter configuration. In this way, a single voltage supply circuit may be used for applications where a boost converter has improved performance and/or lower cost compared to a charge pump as well as for applications where a boost converter has improved performance and/or lower cost compared to a charge pump.

In one example, voltage supply circuitry includes: a positive supply pin and a reference supply pin configured to couple to a supply; a high-side pin and a low-side pin configured to couple to a storage element; an output pin; a high-side switching element configured to electrically couple the positive supply pin and the low-side pin based on a high-side control signal; a low-side switching element configured to electrically couple the reference supply pin and the low-side pin based on a low-side control signal; a first switching element configured to electrically couple the positive supply pin and the high-side pin; a second switching element configured to electrically couple the high-side pin and the output pin; a third switching element configured to electrically couple the output pin and the low-side pin; and driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

In another example, voltage supply circuitry includes: a positive supply pin and a reference supply pin configured to couple to a supply; a high-side pin and a low-side pin configured to couple to a storage element; an output pin; a high-side switching element configured to electrically couple the positive supply pin and a high-side node based on a high-side control signal; a low-side switching element configured to electrically couple the reference supply pin and the low-side pin based on a low-side control signal; a first switching element configured to electrically couple the positive supply pin and the high-side pin; a second switching element configured to electrically couple the high-side pin and the output pin; a third switching element configured to electrically couple the output pin and the low-side pin; a fourth switching element configured to electrically couple the high-side node and the low-side pin; and driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

In one example, voltage supply circuitry includes: a positive supply pin and a reference supply pin configured to couple to a supply; a high-side pin and a low-side pin configured to couple to a storage element; an output pin; a high-side switching element configured to electrically couple the positive supply pin and a high-side node based on a high-side control signal; a low-side switching element configured to electrically couple the reference supply pin and the low-side pin based on a low-side control signal; a first diode comprising an anode coupled to the positive supply pin and a cathode coupled to the high-side pin; a second diode comprising an anode coupled to the high-side pin and a cathode coupled to the output pin; a third diode comprising an anode coupled to the low-side pin and a cathode coupled to the output pin; a fourth diode comprising an anode coupled to the high-side node and a cathode coupled to the low-side pin; and driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

Details of these and other examples are set forth in the accompanying drawings and the description below. Other features, objects, and advantages will be apparent from the description and drawings, and from the claims.

Figure 1:
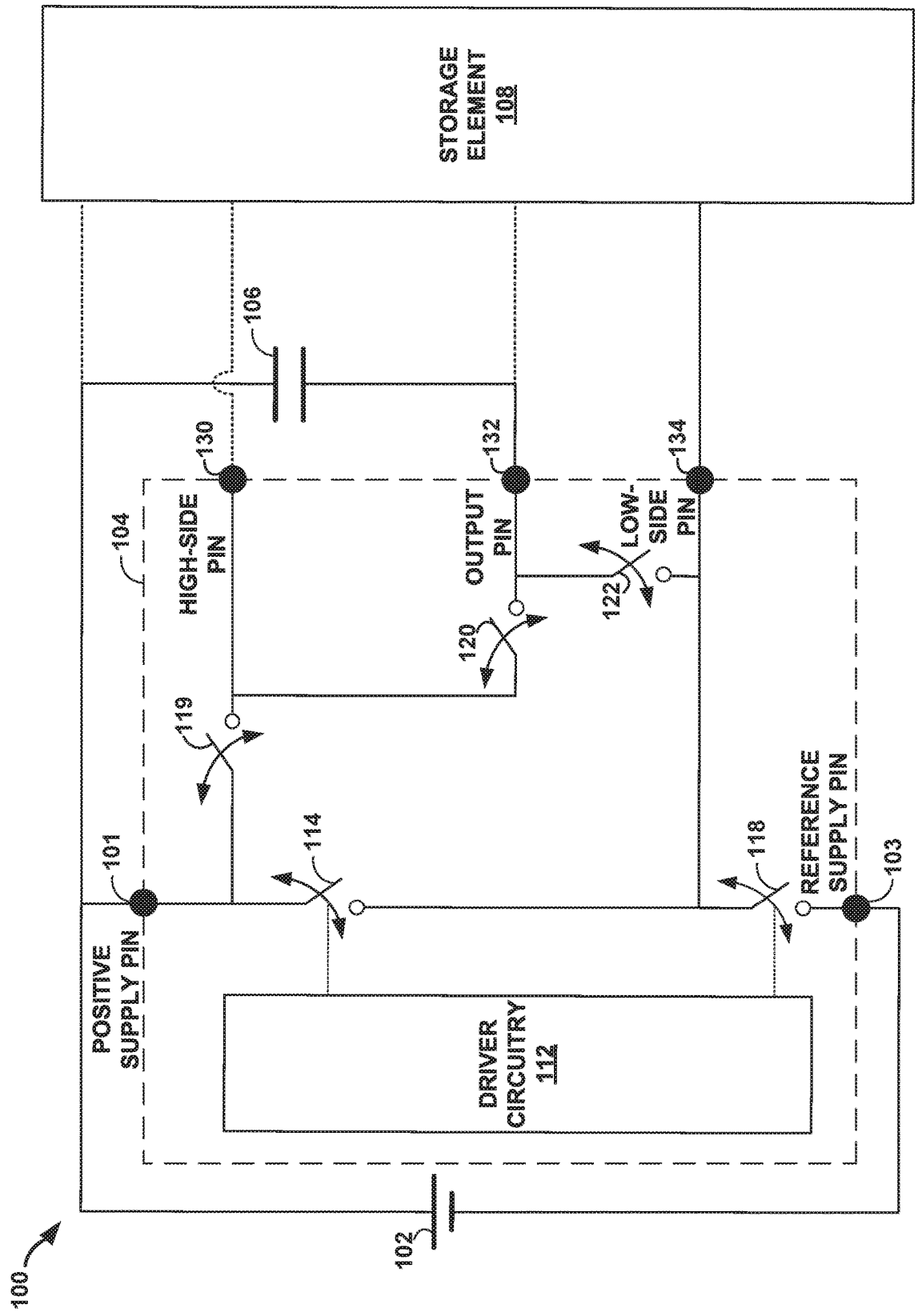
FIG. 1 is a block diagram illustrating an example system for providing charge pump mode and boost converter mode functionality, in accordance with one or more techniques of this disclosure.

The details of one or more examples are set forth in the accompanying drawings and the description below. Other features, objects, and advantages will be apparent from the description, drawings, and claims.

DETAILED DESCRIPTION

In general, this disclosure is directed to techniques for implementing voltage supply circuitry configured to operate in a charge pump mode and a boost converter mode. For example, a single voltage supply circuit may be used for applications where a boost converter has improved performance and/or lower cost compared to a charge pump as well as for applications where a boost converter has improved performance and/or lower cost compared to a charge pump. While the forgoing discusses an automobile application, techniques described herein for voltage supply circuitry configured to operate in a charge pump mode and a boost converter mode may be used in other applications.

In an example automotive application, when a Metal-Oxide-Semiconductor Field Effect Transistor (MOSFET) transistor or simply "transistor" is turned on, a voltage of at least 10 Volts is placed between a gate and source of the transistor. This voltage of at least 10 Volts is greater than a battery voltage and may be generated by a gate driver.

However, generation of the voltage of at least 10 Volts greater than the battery voltage in 12 Volt systems can be difficult, because the minimum allowed battery voltage can be as low as 3 Volts, with a duration of tens of milliseconds (which for the integrated circuit (IC) means continuous operation). A multistage charge pump or a DC/DC boost converter may be used to generate the voltage of at least 10 Volts greater than the battery voltage under these conditions. However, the multistage charge pump may have multiple implementation problems, including larger difficulty in control, larger IC size, and a larger number of external components compared to a boost converter. As such, a boost converter may be preferred choice over a multistage charge pump for some 12 Volt automotive systems. For example, the boost converter may be simpler to implement and have faster speed compared to the multistage charge pump for some 12 Volt automotive systems.

In 48 Volt automotive systems, because the minimum allowed voltage around 20 Volts, a single stage charge pump may generate the 10 Volts above the battery voltage using only two capacitors. In comparison the boost converter may use an inductor, which may have a price that is higher than that of several capacitors, and a capacitor. As such, a charge pump may have a reduced cost compared to using a boost converter for 48 Volt automotive systems. As such, a gate driver using a boost converter may use semiconductor components (e.g., a transistor) which are too expensive or unnecessary in 48 Volt automotive systems, while a gate driver which uses a single stage charge pump may not be able to fulfill the requirements of 12 Volt automotive systems. In accordance with the techniques of the disclosure, voltage supply circuitry may be configured to be usable in both 12 Volt and 48 Volt automotive systems, while optimizing the number and price of the external components used. Again, techniques described herein for providing charge pump mode and boost converter mode functionality may be used for applications other than automotive applications and may be used for other voltage systems than 12 Volt and 48 volt systems.

FIG. 1 is a block diagram illustrating an example system 100 for providing charge pump mode and boost converter mode functionality, in accordance with one or more techniques of this disclosure. As illustrated in the example of FIG. 1, system 100 may include supply 102, voltage supply circuitry 104, capacitor 106, and storage element 108.

Supply 102 may be configured to provide electrical power to one or more other components of system 100. For instance, supply 102 may be configured to supply power to capacitor 106 and/or storage element 108. In some examples, supply 102 may be a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, supply 102 may be an output of a power converter or power inverter. For instance, supply 102 may be an output of a direct current (DC) to DC power converter, an alternating current (AC) to DC power converter, a DC to AC power inverter, and the like. In some examples, supply 102 may represent a connection to an electrical supply grid. In some examples, the input power signal provided by supply 102 may be a DC input power signal. For instance, supply 102 may be configured to provide a DC input power signal in the range of ~3 VDC to ~50 VDC (e.g., 3-15 Volts, 20-50 Volts, etc.).

Voltage supply circuitry 104 may represent circuitry for operating in a charge pump mode and for operating in a boost converter mode. In some examples, voltage supply circuitry 104 may represent an integrated circuit (IC). Voltage supply circuitry 104 may include positive supply pin 101, reference supply pin 103, high-side pin 130, low-side pin 134, output pin 132, high-side switching element 114, low-side switching element 118, first switching element 119, second switching element 120, third switching element 122, and driver circuitry 112. In some examples, voltage supply circuitry 104 may include a fourth switching element (e.g., a voltage-controlled switch, a diode, etc.) arranged in series and between high-side switching element 114 and low-side pin 134.

Examples of a switching element may include, but are not limited to, 2-terminal devices, 3-terminal devices, 4-terminal devices, and another switching element. Examples of 3-terminal devices and/or 4-terminal devices may include, but are not limited to, a Silicon Controlled Rectifier (SCR), a Field Effect Transistor (FET), and a Bipolar Junction Transistor (BJT). Examples of a FET may include, but are not limited to, a Junction Field-Effect transistor (JFET), a Metal-Oxide-Semiconductor FET (MOSFET), a dual-gate MOSFET, a FinFETs, an Insulated-Gate Bipolar Transistor (IGBT), any another type of FET, or any combination of the same. Examples of a MOSFET may include, but are not limited to, a PMOS, a NMOS, a DMOS, or any other type of MOSFET, or any combination of the same. Examples of a BJT may include, but are not limited to, a PNP, a NPN, a heterojunction, or any another type of a BJT, or any combination of the same. Switching devices may be voltage-controlled and/or current-controlled. Examples of current-controlled switching devices may include, but are not limited to, gallium nitride (GaN) MOSFETs, BJTs, or other current-controlled elements. Examples of two-terminal devices may include, but are not limited to, a diode, a Schottky diode, an avalanche diode, a Zener diode, or another two-terminal device.

First switching element 119 may include a first voltage-controlled switch including a first node coupled to positive supply pin 101 and a second node coupled to high-side pin 130. In some examples, first switching element 119 may include a first diode including an anode coupled to positive supply pin 101 and a cathode coupled to high-side pin 130. Second switching element 120 may include a second voltage-controlled switch including a first node coupled to high-side pin 130 and a second node coupled to output pin 132. In some examples, second switching element 120 may include a second diode including an anode coupled to high-side pin 130 and a cathode coupled to output pin 132. Third switching element 122 may include a third voltage-controlled switch including a first node coupled to low-side pin 134 and a second node coupled to output pin 132. In some examples, third switching element 122 may include a third diode including an anode coupled to low-side pin 134 and a cathode coupled to output pin 132.

Storage element 108 may include a capacitor. As used herein, a capacitor may include an electrical component configured to store electrical energy in an electric field. Examples of a capacitor may include, but are not limited to, a ceramic capacitor, a film capacitor, an electrolytic capacitor (e.g., aluminum, tantalum, niobium, or the like), a super capacitor (e.g., double layer, pseudo capacitors, hybrid capacitors), a mica capacitor, or another capacitor. Although a capacitor may be described as a single capacitor, a capacitor may include an array of capacitive elements. For instance, a capacitor may be an array of capacitive elements coupled in parallel and/or series. In some instances, each capacitive element may be a discrete component, while in other instances, each one of the capacitive elements may be contained within a single package (e.g., capacitor array).

Storage element 108 may include an inductor. As used herein, an inductor may include an electrical component configured to store electrical energy in a magnetic field. Although an inductor may be described as a single inductor, an inductor may include an array of inductive elements. For instance, an inductor may be an array of inductive elements coupled in parallel and/or series.

As shown, storage element 108 may have a first node coupled to low-side pin 134. In some examples, a second node of storage element 108 may be coupled to high-side pin 130 (see FIGS. 2A, 2B. 4A, 4B). The second node of storage element 108 may be coupled to positive supply pin 101 (see FIGS. 3A, 3B). In some examples, the second node of storage element 108 may be coupled to output pin 132.

Driver circuitry 112 may be configured to generate a high-side control signal at high-side switching element 114 and a low-side control signal at low-side switching element 118. For example, in response to determining that storage element 108 is arranged in a charge pump configuration with voltage supply circuitry 104, driver circuitry 112 may be configured to generate, during a first phase of a charge pump configuration mode, the high-side control signal to switch-out high-side switching element 114 and the low-side control signal to switch-in low-side switching element 118. In this example, driver circuitry 112 may be configured to generate, during a second phase of the charge pump configuration mode, the high-side control signal to switch-in high-side switching element 114 and the low-side control signal to switch-out low-side switching element 118.

In response, however, to determining that storage element 108 is arranged in a boost converter configuration with voltage supply circuitry 104, driver circuitry 112 may be configured to generate, during a first phase of a boost converter configuration mode, the high-side control signal to switch-out high-side switching element 114 and the low-side control signal to switch-in low-side switching element 118. In this example, driver circuitry 112 may be configured to generate, during a second phase of the boost converter configuration mode, the high-side control signal to switch-out high-side switching element 114 and the low-side control signal to switch-out low-side switching element 118.

Driver circuitry 112 may be configured to receive an indication of when storage element 108 is arranged in a charge pump configuration with voltage supply 102. For example, driver circuitry 112 may be configured to be programmed with an indication that storage element 108 is arranged in a charge pump configuration with voltage supply 102. Similarly, driver circuitry 112 may be configured to receive an indication of when storage element 108 is arranged in a boost converter configuration with voltage supply 102. For example, driver circuitry 112 may be configured to be programmed with an indication that storage element 108 is arranged in a boost converter configuration with voltage supply 102.

Driver circuitry 112 may be configured to automatically determine when storage element 108 is arranged in a charge pump configuration with voltage supply 102. For example, driver circuitry 112 may be configured to determine that storage element 108 is arranged in the charge pump configuration with voltage supply 102 based on a voltage and/or current at system 100 (See FIGS. 7-11). Similarly, driver circuitry 112 may be configured to determine when storage element 108 is arranged in a boost converter configuration with voltage supply 102. For example, driver circuitry 112 may be configured to determine that storage element 108 is arranged in the boost converter configuration with voltage supply 102 based on a voltage and/or current at system 100 (See FIGS. 7-11).

In accordance with the techniques of the disclosure, FIG. 1 represents an example of voltage supply circuitry comprising a positive supply pin 101 and a reference supply pin 103 configured to couple to supply 102. In this example, high-side pin 130 and low-side pin 134 are configured to couple to storage element 108. In this example, high-side switching element 114 is configured to electrically couple positive supply pin 101 and low-side pin 134 based on a high-side control signal. In this example, low-side switching element 118 is configured to electrically couple reference supply pin 103 and the low-side pin 134 based on a low-side control signal. In this example, first switching element 119 is configured to electrically couple positive supply pin 101 and high-side pin 130.

In this example, second switching element 120 is configured to electrically couple high-side pin 130 and output pin 132. In this example, third switching element 122 is configured to electrically couple output pin 132 and low-side pin 134. In this example, driver circuitry 112 is configured to generate the high-side control signal and the low-side control signal for operating in a charge pump mode when storage element 108 is arranged in a charge pump configuration with voltage supply circuitry 104 and to generate the high-side control signal and the low-side control signal for operating in a boost converter mode when storage element 108 is arranged in a boost converter configuration with voltage supply circuitry 104. As such, voltage supply circuitry 104 may be configured to operate in a charge pump mode and a boost converter mode. In this way, voltage supply circuitry 104 may not rely on any additional pin for mode selection. In some examples, voltage supply circuitry 104 may be configured to automatically adjust internal parameters (e.g., a frequency, a peak current, a current limitation, etc.).

Figure 2A:
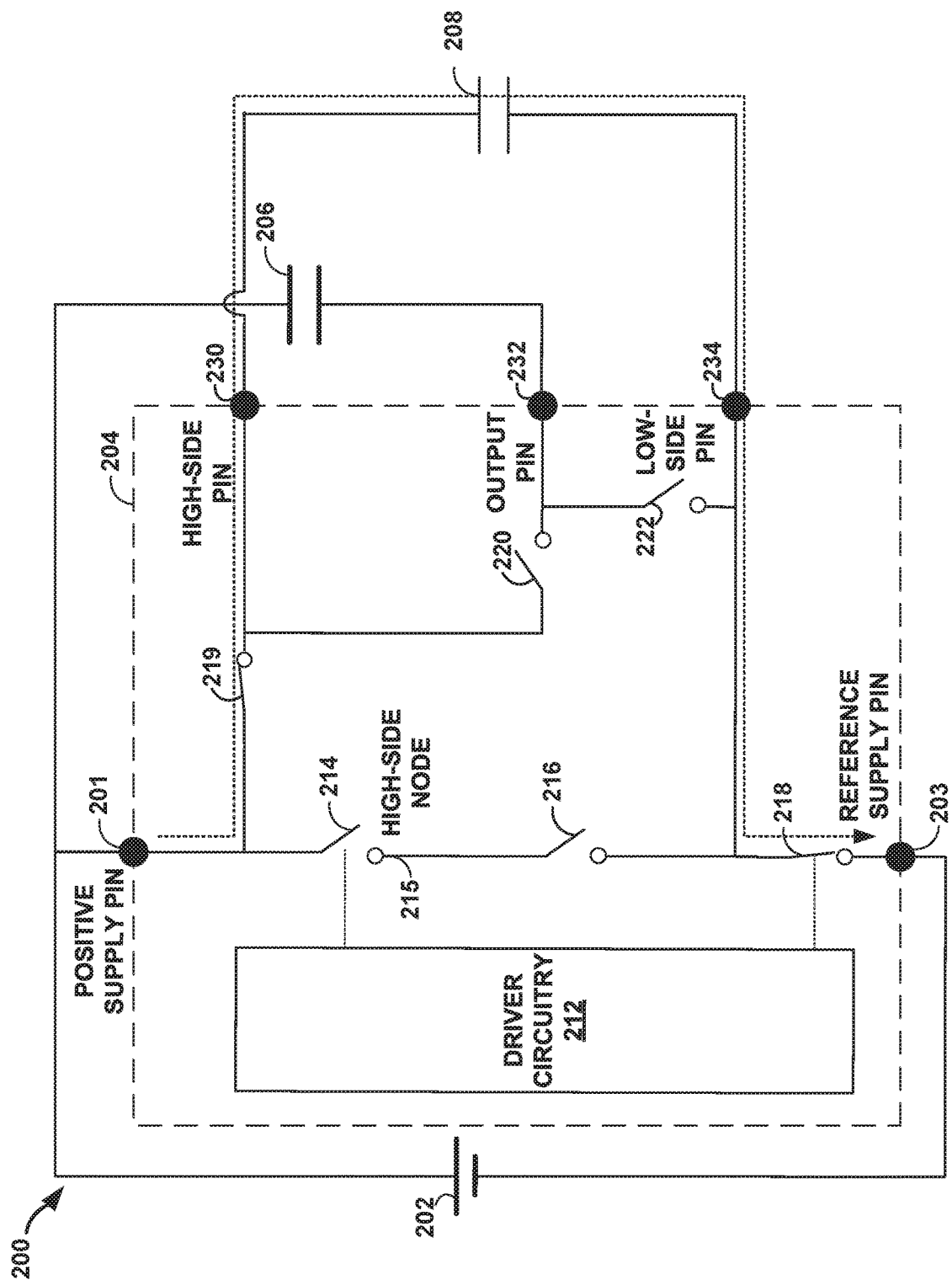
FIG. 2A is a conceptual diagram illustrating a first circuit for providing charge pump mode and boost converter mode functionality operating in a first phase of the charge pump mode, in accordance with one or more techniques of this disclosure.

FIG. 2A is a conceptual diagram illustrating a first circuit 200 for providing charge pump mode and boost converter mode functionality operating in a first phase of the charge pump mode, in accordance with one or more techniques of this disclosure. As shown, circuit 200 includes supply 202, voltage supply circuitry 204, capacitor 206, and capacitor 208, which may be examples of supply 102, voltage supply circuitry 104, capacitor 106, and storage element 108, respectively, of FIG. 1. For example, voltage supply circuitry 204 may include positive supply pin 201, reference supply pin 203, high-side pin 230, low-side pin 234, output pin 232, high-side switching element 214, low-side switching element 218, first switching element 219, second switching element 220, third switching element 222, and driver circuitry 212, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIGS. 2A, 2B includes fourth switching element 216, however, in some examples, fourth switching element 216 may be omitted (e.g., high side node 215 is directly coupled to low-side pin 234).

Figure 2B:
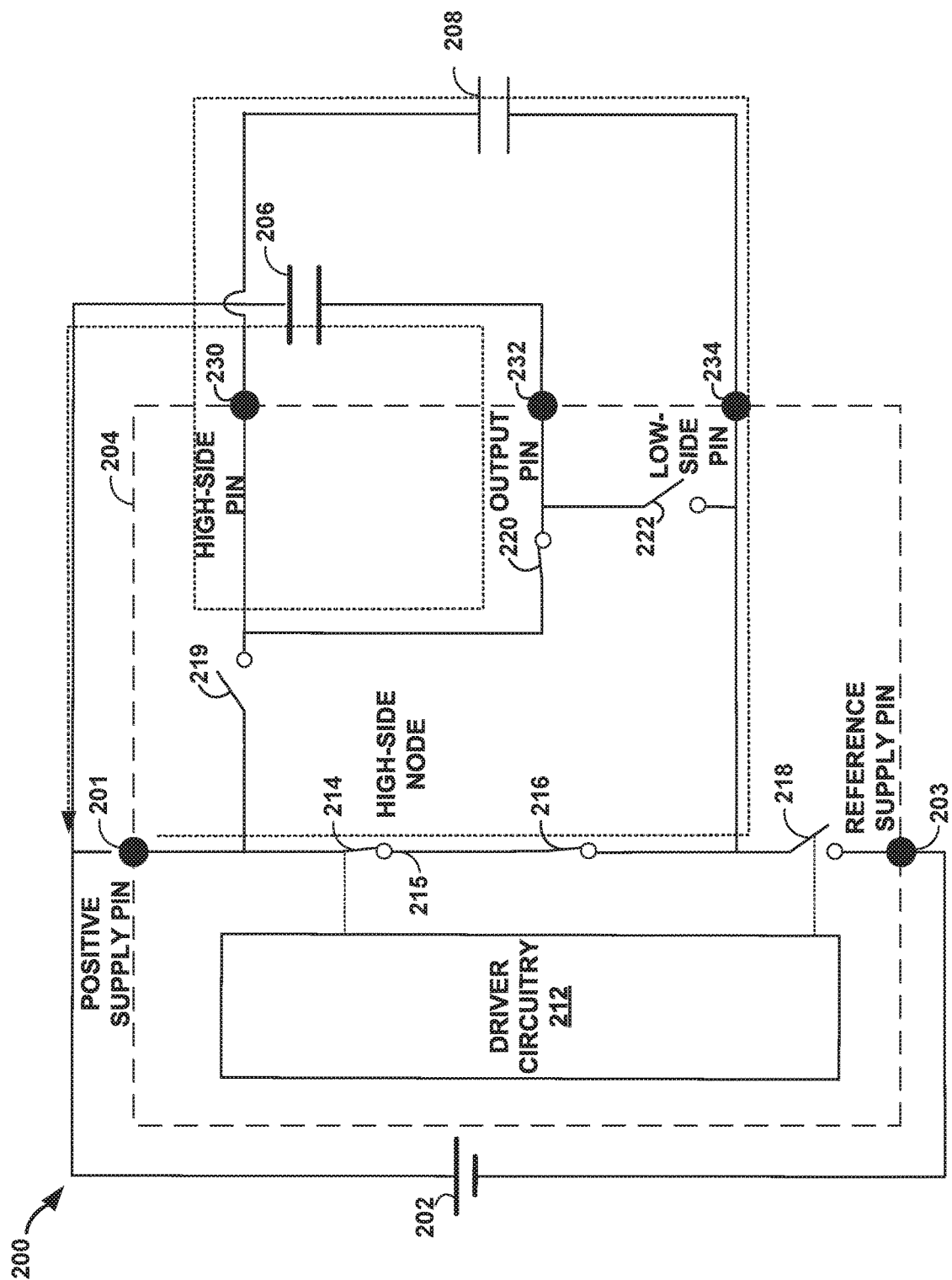
FIG. 2B is a conceptual diagram illustrating a first circuit for providing charge pump mode and boost converter mode functionality operating in a second phase of the charge pump mode, in accordance with one or more techniques of this disclosure.

In the example of FIGS. 2A, 2B, the storage element includes capacitor 208. As shown, capacitor 208 includes a first node coupled to high-side pin 230 and a second node coupled to low-side pin 234. In this example, capacitor 206 includes a first node coupled to positive supply pin 201 and a second node coupled to output pin 232. In other examples, however, capacitor 206 may be connected differently to voltage supply circuitry 204. For example, capacitor 206 may include a first node coupled to output pin 232 and a second node coupled to reference supply pin 203.

In the charge pump configuration, switching element 216 and switching element 222 may help to allow circuit 200 to operate in the charge pump mode. FIG. 2A illustrates an example when circuit 200 is operating in charge pump mode and capacitor 208 is charged by supply 202. For example, driver circuitry 212 may be configured to switch-out high-side switching element 214 and switch-in low-side switching element 218 such that capacitor 208 is charged by supply 202. Because high-side switching element 214 is off, there is no current flowing through switching element 216 and switching element 222 (e.g., a diode) is switched-out (e.g., reverse biased). As such, there may be no undesirable effect of switching element 216 and switching element 222 on the behavior of the charge pump mode.

FIG. 2B is a conceptual diagram illustrating a first circuit 200 for providing charge pump mode and boost converter mode functionality operating in a second phase of the charge pump mode, in accordance with one or more techniques of this disclosure. In the example of FIG. 2B, high-side switching element 214 is switched-in and switching element 216 (e.g., a diode) is switched-in (e.g., forward biased), thereby allowing the charging of capacitor 206 by supply 202 through charge redistribution between capacitor 206 and capacitor 208, while switching element 222 (e.g., a diode) is switched-out (e.g., reverse biased), which may not adversely affect the behavior of voltage supply circuitry 204. For example, driver circuitry 212 may be configured to switch-in, when operating in a second phase of the charge pump mode, high-side switching element 214 and switch-out low-side switching element 218 such that capacitor 208 charges capacitor 206.

Figure 3A:
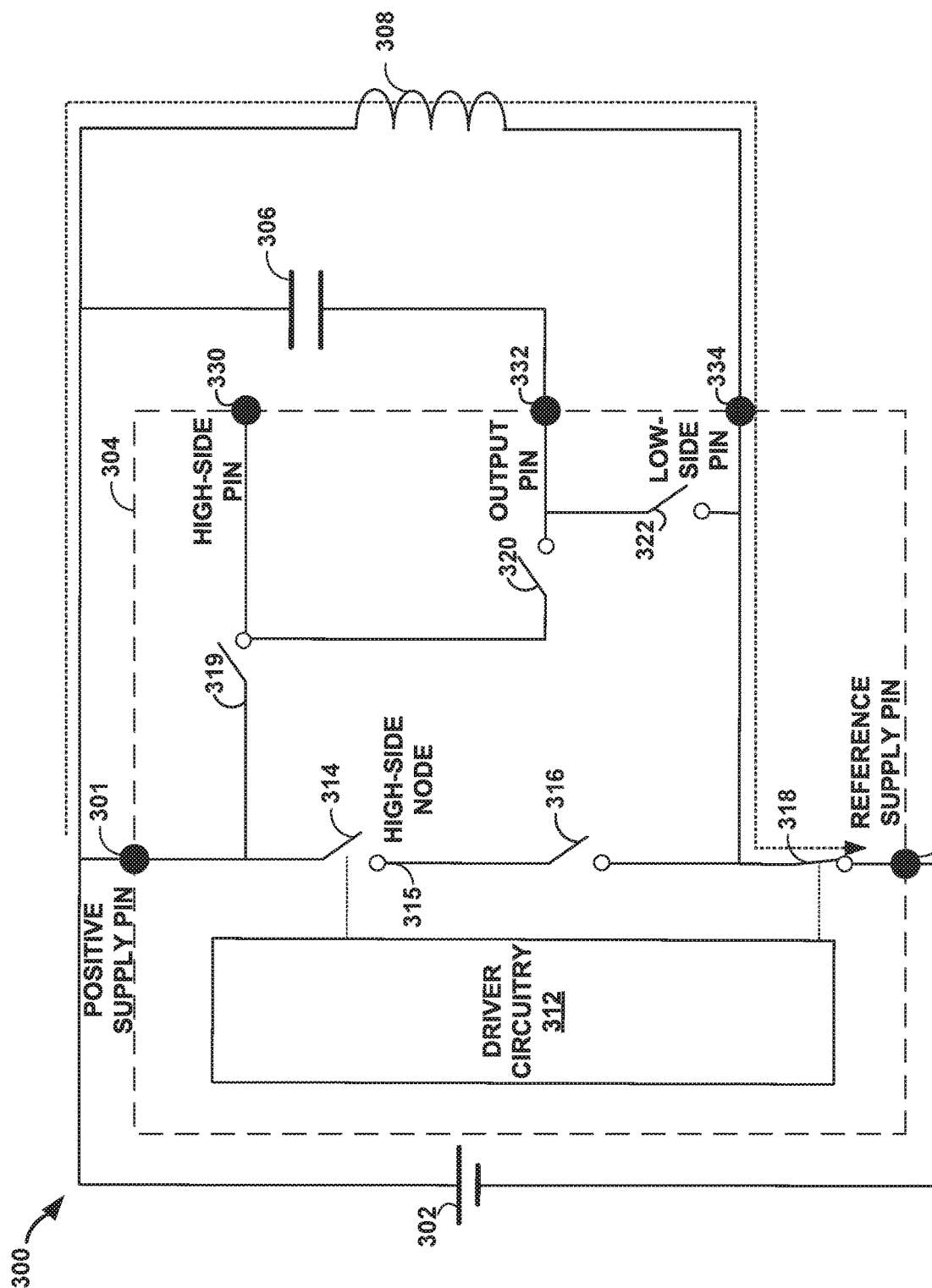
FIG. 3A is a conceptual diagram illustrating a second circuit for providing charge pump mode and boost converter mode functionality operating in a first phase of the boost converter mode, in accordance with one or more techniques of this disclosure.

FIG. 3A is a conceptual diagram illustrating a second circuit 300 for providing charge pump mode and boost converter mode functionality operating in a first phase of the boost converter mode, in accordance with one or more techniques of this disclosure. As shown, circuit 300 includes supply 302, voltage supply circuitry 304, capacitor 306, and inductor 308, which may be examples of supply 102, voltage supply circuitry 104, capacitor 106, and storage element 108, respectively, of FIG. 1. For example, voltage supply circuitry 304 may include positive supply pin 301, reference supply pin 303, high-side pin 330, low-side pin 334, output pin 332, high-side switching element 314, low-side switching element 318, first switching element 319, second switching element 320, third switching element 322, and driver circuitry 312, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIGS. 3A, 3B includes fourth switching element 316, however, in some examples, fourth switching element 316 may be omitted (e.g., high side node 315 is directly coupled to low-side pin 334).

Figure 3B:
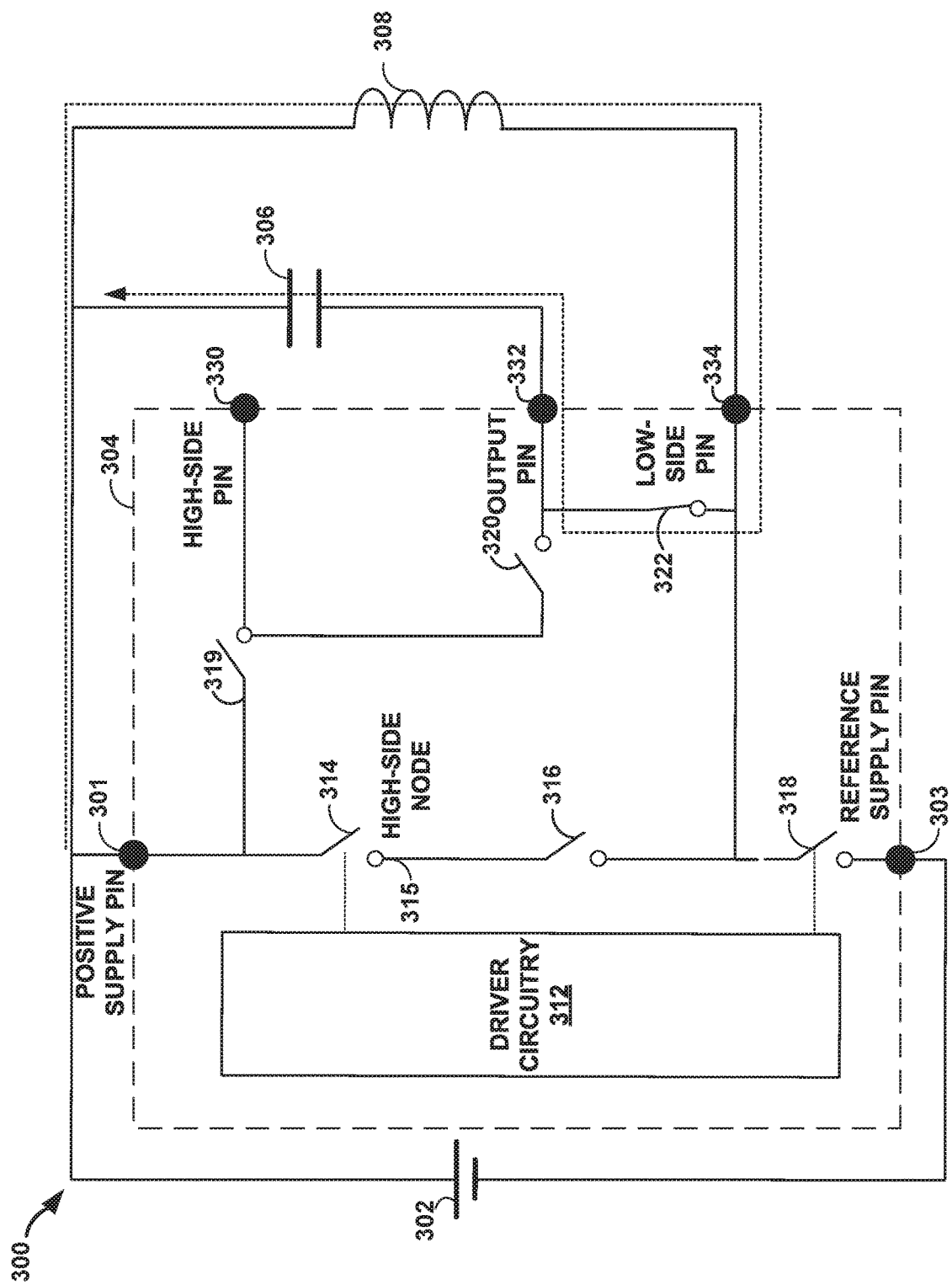
FIG. 3B is a conceptual diagram illustrating a second circuit for providing charge pump mode and boost converter mode functionality operating in a second phase of the boost converter mode, in accordance with one or more techniques of this disclosure.

In the example of FIGS. 3A, 3B, the storage element includes inductor 308. As shown, inductor 308 includes a first node coupled to positive supply pin 301 and a second node coupled to low-side pin 334. In other examples, however, inductor 308 may be connected differently to voltage supply circuitry 304. For example, inductor 308 may include a first node coupled to high-side pin 330 and a second node coupled to low-side pin 334 (see FIGS. 4A, 4B).

Driver circuitry 312 may be configured to switch-out, when operating in the first phase of the boost converter mode, high-side switching element 314 and switch-in low-side switching element 318 such that inductor 308 is charged by supply 302. For example, in a first phase (e.g., a coil charging phase) of the boost converter mode, driver circuitry 312 may be configured to switch-in low-side switching element 318, thereby connecting inductor 308 between a first terminal (e.g., a positive terminal) of supply 302 and a second terminal of supply 302 (e.g., a negative terminal, a reference node, ground, etc.). In this example, fourth switching element 316 is floating, because high-side switching element 314 is switched-out, while first switching element 319, second switching element 320, and third switching element 322 are switched-out (e.g., reverse biased). In some examples, driver circuitry 312 may be configured to generate a third control signal for operating third switching element 322 in the boost converter mode. For instance, driver circuitry 312 may be configured to generate the third control signal at a control node of third switching element 322 that causes third switching element 322 to switch-out when operating in the first phase of the boost converter mode.

FIG. 3B is a conceptual diagram illustrating a second circuit 300 for providing charge pump mode and boost converter mode functionality operating in a second phase of the boost converter mode, in accordance with one or more techniques of this disclosure. Driver circuitry 312 may be configured to switch-out, when operating in a second phase of the boost converter mode, high-side switching element 314 and switch-out, when operating in a second phase of the boost converter mode, low-side switching element 318 such that inductor 308 charges capacitor 306. For example, during the second phase of the boost converter operation, inductor 308 charges capacitor 306. Driver circuitry 312 may switch-out high-side switching element 314 and low-side switching element 318. In this example, fourth switching element 316 is floating, first switching element 319 and second switching element 320 are switched-out (e.g., in reverse bias) and third switching element 322 is switched-in (e.g., conducting). In some examples, driver circuitry 312 may be configured to generate a third control signal for operating third switching element 322 in the boost converter mode. For instance, driver circuitry 312 may be configured to generate the third control signal at a control node of third switching element 322 that causes third switching element 322 to switch-in when operating in the second phase of the boost converter mode.

Figure 4A:
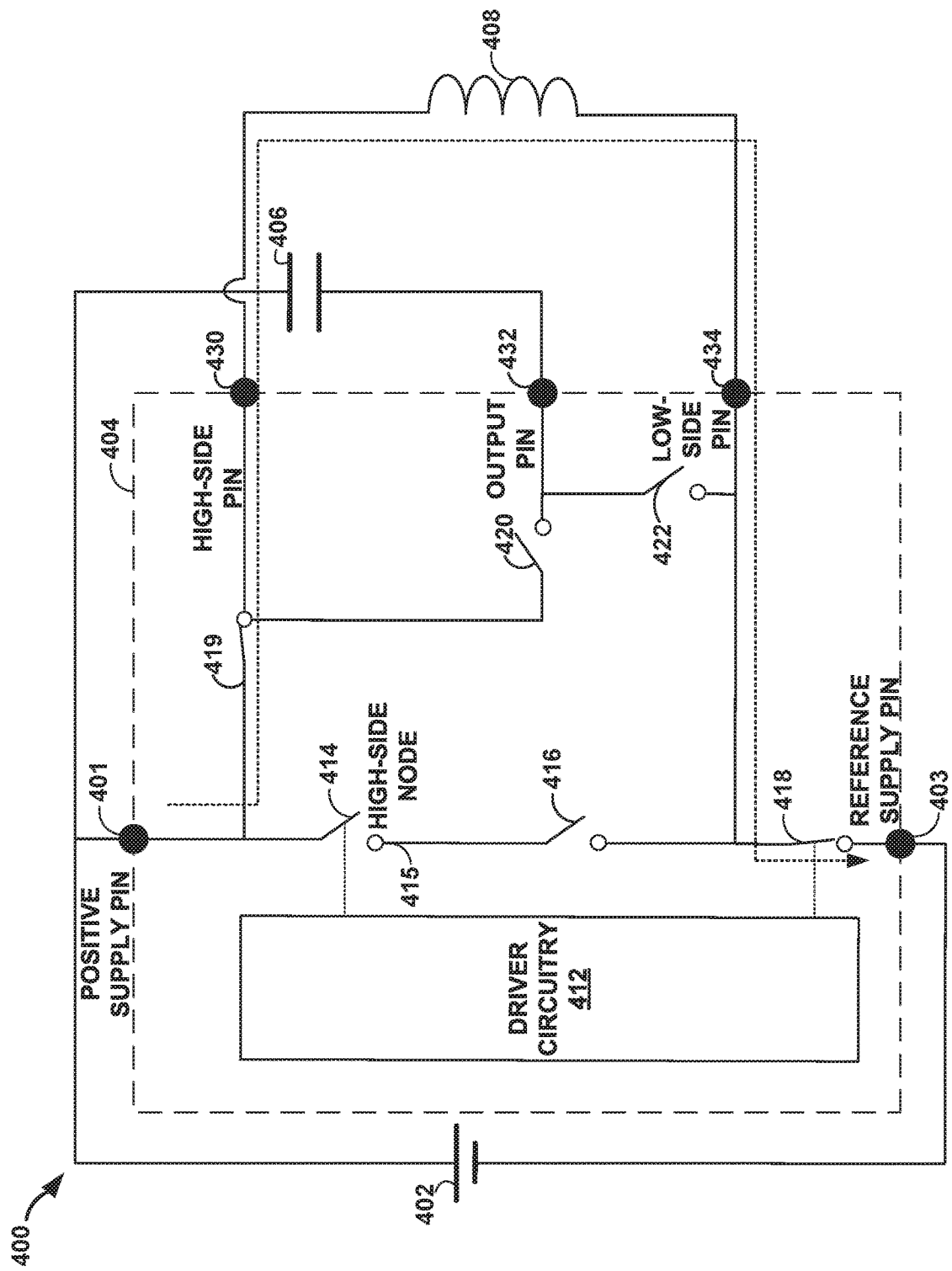
FIG. 4A is a conceptual diagram illustrating a third circuit for providing charge pump mode and boost converter mode functionality operating in a first phase of the boost converter mode, in accordance with one or more techniques of this disclosure.

FIG. 4A is a conceptual diagram illustrating a third circuit 400 for providing charge pump mode and boost converter mode functionality operating in a first phase of the boost converter mode, in accordance with one or more techniques of this disclosure. As shown, circuit 400 includes supply 402, voltage supply circuitry 404, capacitor 406, and inductor 408, which may be examples of supply 102, voltage supply circuitry 104, capacitor 106, and storage element 108, respectively, of FIG. 1. For example, voltage supply circuitry 404 may include positive supply pin 401, reference supply pin 403, high-side pin 430, low-side pin 434, output pin 432, high-side switching element 414, low-side switching element 418, first switching element 419, second switching element 420, third switching element 422, and driver circuitry 412, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIGS. 4A, 4B includes fourth switching element 416, however, in some examples, fourth switching element 416 may be omitted (e.g., high side node 415 is directly coupled to low-side pin 434).

Figure 4B:
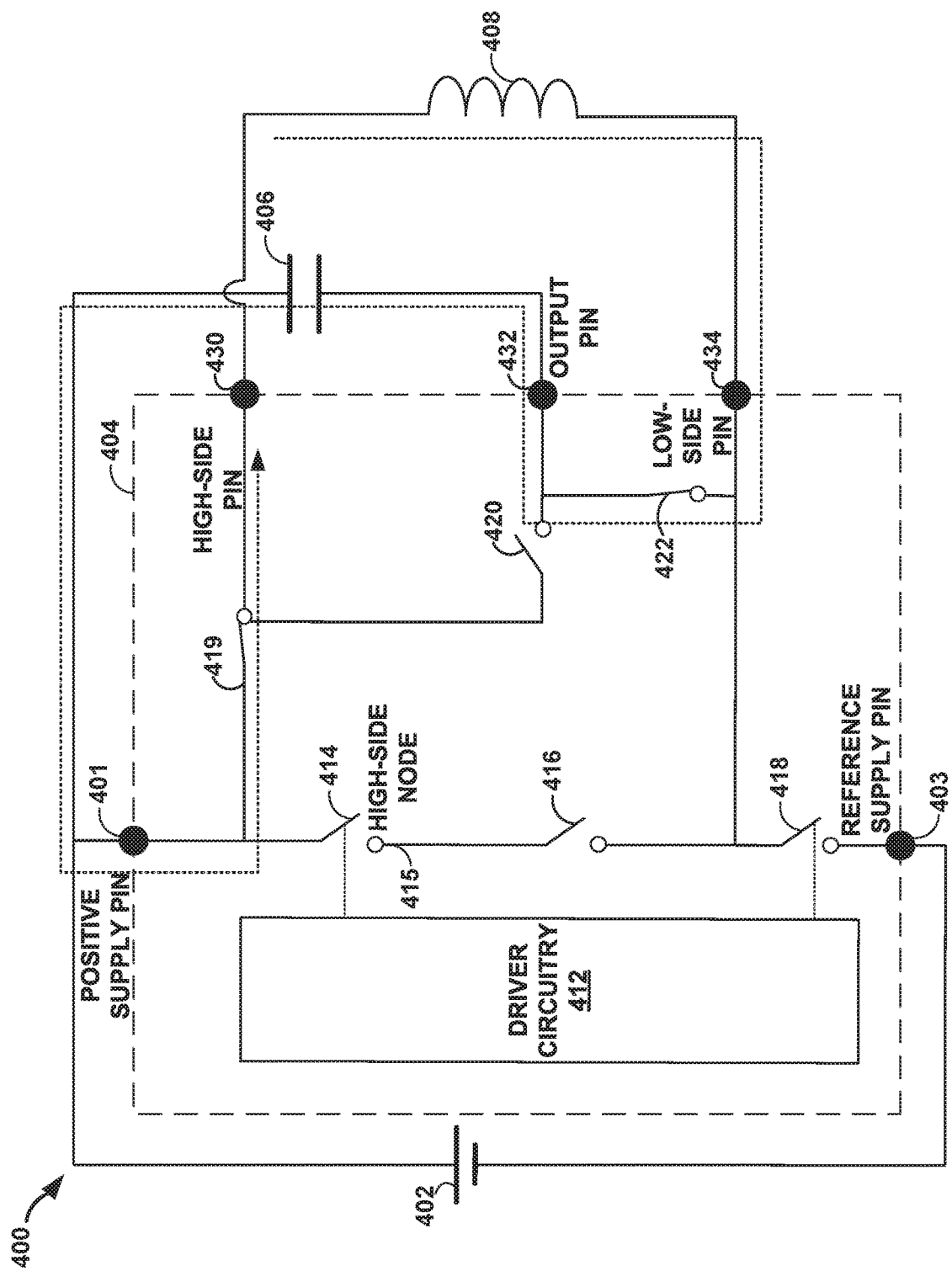
FIG. 4B is a conceptual diagram illustrating a third circuit for providing charge pump mode and boost converter mode functionality operating in a second phase of the boost converter mode, in accordance with one or more techniques of this disclosure.

In the example of FIGS. 4A, 4B, the storage element includes inductor 408. As shown, inductor 408 includes a first node coupled to high-side pin 430 and a second node coupled to low-side pin 434. In other examples, however, inductor 408 may be connected differently to voltage supply circuitry 404. For example, inductor 408 may include a first node coupled to positive supply pin 401 and a second node coupled to low-side pin 434 (see FIGS. 3A, 3B). Driver circuitry 412 may be configured to switch-out, when operating in the first phase of the boost converter mode, high-side switching element 414 and switch-in low-side switching element 418 such that inductor 408 is charged by supply 302. In some examples, driver circuitry 412 may be configured to generate a third control signal for operating third switching element 422 in the boost converter mode. For instance, driver circuitry 412 may be configured to generate the third control signal at a control node of third switching element 422 that causes third switching element 422 to switch-out when operating in the first phase of the boost converter mode.

FIG. 4B is a conceptual diagram illustrating a third circuit for providing charge pump mode and boost converter mode functionality operating in a second phase of the boost converter mode, in accordance with one or more techniques of this disclosure. During the second phase of the boost converter operation, inductor 408 charges capacitor 406. Driver circuitry 412 may be configured to switch-out, when operating in a second phase of the boost converter mode, high-side switching element 414 and switch-out, when operating in a second phase of the boost converter mode, low-side switching element 418 such that inductor 408 charges capacitor 406. In some examples, driver circuitry 412 may be configured to generate a third control signal for operating third switching element 422 in the boost converter mode. For instance, driver circuitry 412 may be configured to generate the third control signal at a control node of third switching element 422 that causes third switching element 422 to switch-in when operating in the second phase of the boost converter mode.

Figure 5:
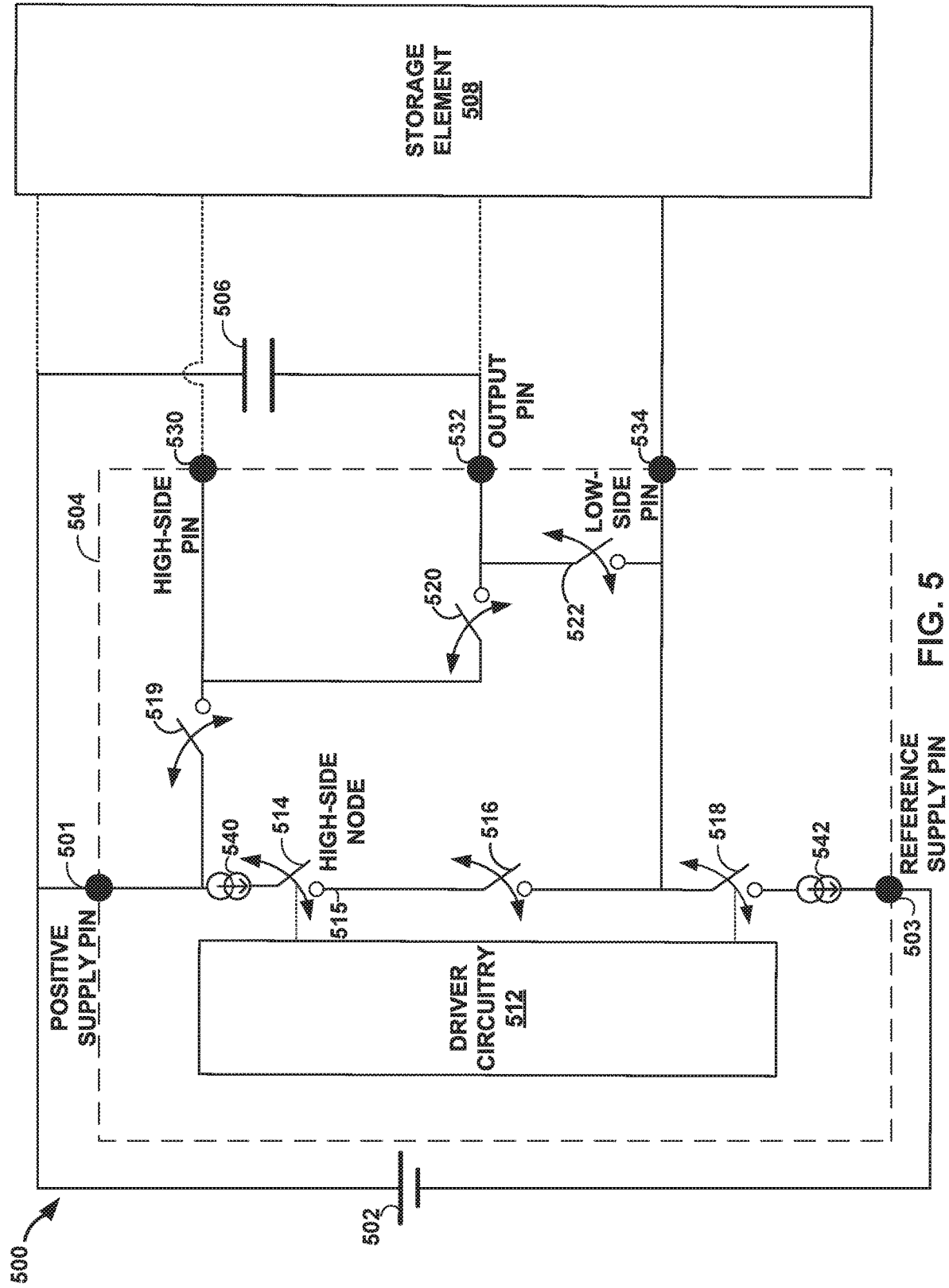
FIG. 5 is a conceptual diagram illustrating a fourth circuit for providing charge pump mode and boost converter mode functionality with first current limiting circuitry, in accordance with one or more techniques of this disclosure.

FIG. 5 is a conceptual diagram illustrating a fourth circuit 500 for providing charge pump mode and boost converter mode functionality with first current limiting circuitry, in accordance with one or more techniques of this disclosure. As shown, circuit 500 includes supply 502, voltage supply circuitry 504, capacitor 506, and storage element 508, which may be examples of supply 102, voltage supply circuitry 104, capacitor 106, and storage element 108, respectively, of FIG. 1. For example, voltage supply circuitry 504 may include positive supply pin 501, reference supply pin 503, high-side pin 530, low-side pin 534, output pin 532, high-side switching element 514, low-side switching element 518, first switching element 519, second switching element 520, third switching element 522, and driver circuitry 512, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 5 includes fourth switching element 516, however, in some examples, fourth switching element 516 may be omitted (e.g., high side node 515 is directly coupled to low-side pin 534).

As shown, voltage supply circuitry 504 may include first current limiting circuitry 540 configured to regulate current from positive supply pin 501 into high-side switching element 514. In some examples, voltage supply circuitry 504 may include second current limiting circuitry 542 configured to regulate current output to reference supply pin 503 from voltage supply circuitry 504. In this way, first current limiting circuitry 540 and/or second current limiting circuitry 542 may help to limit peak currents to a predetermined current value. Additionally, in some examples, first current limiting circuitry 540 and/or second current limiting circuitry 542 may help to reduce a failure case with external shorts (e.g. shorted capacitor), which may help to improve a reliability of circuit 500.

Figure 6:
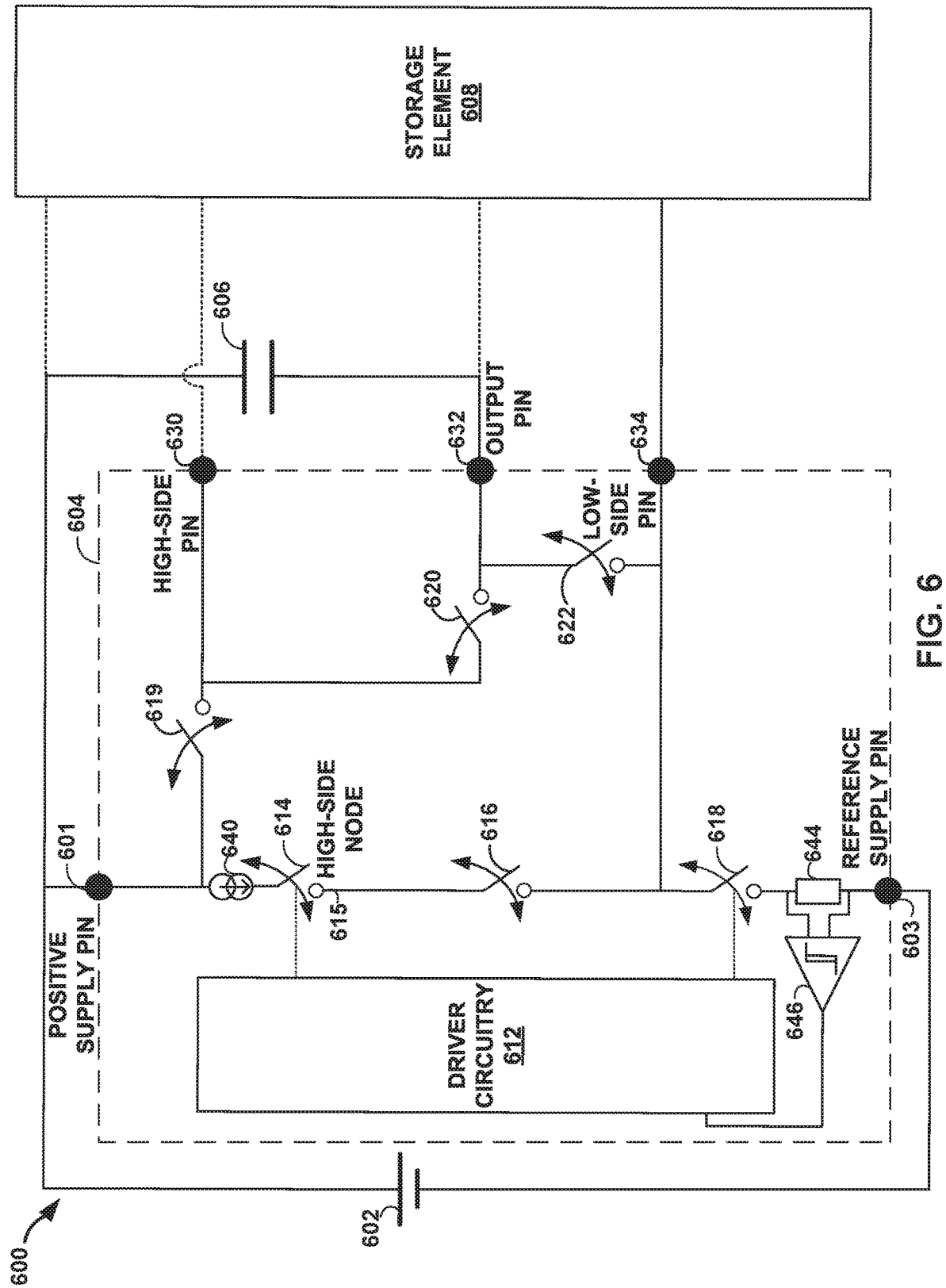
FIG. 6 is a conceptual diagram illustrating a fifth circuit for providing charge pump mode and boost converter mode functionality with second current limiting circuitry, in accordance with one or more techniques of this disclosure.

FIG. 6 is a conceptual diagram illustrating a fifth circuit 600 for providing charge pump mode and boost converter mode functionality with second current limiting circuitry, in accordance with one or more techniques of this disclosure. As shown, circuit 600 includes supply 602, voltage supply circuitry 604, capacitor 606, and storage element 608, which may be examples of supply 102, voltage supply circuitry 104, capacitor 106, and storage element 108, respectively, of FIG. 1. For example, voltage supply circuitry 604 may include positive supply pin 601, reference supply pin 603, high-side pin 630, low-side pin 634, output pin 632, high-side switching element 614, low-side switching element 618, first switching element 619, second switching element 620, third switching element 622, and driver circuitry 612, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 6 includes fourth switching element 616, however, in some examples, fourth switching element 616 may be omitted (e.g., high side node 615 is directly coupled to low-side pin 634).

As shown, voltage supply circuitry 604 may include first current limiting circuitry 640 configured to regulate current from positive supply pin 601 into high-side switching element 614. As shown, voltage supply circuitry 604 may include second current sensing circuitry 644 configured to sense current output to reference supply pin 603 from voltage supply circuitry 604. In this example, driver circuitry 612 may be configured to generate the high-side control signal and/or the low-side control signal based on the current output to reference supply pin 603. For example, driver circuitry 612 may be configured to switch-out low-side switching element 618 based on the current output to reference supply pin 613. In some examples, high-side switching element 614 and/or low-side switching element 618 may be used to directly limit current (e.g. as output of a current mirror). In some examples, voltage supply circuitry 612 may use a voltage drop at high-side switching element 614 to sense current at high-side switching element 614. Similarly, in some examples, voltage supply circuitry may use a voltage drop at low-side switching element 618 to sense current at low-side switching element 618. In some examples, driver circuitry 612 may use the sensed current at high-side switching element 614 and/or the sensed current at low-side switching element 618 to generate the high-side control signal and/or low-side control signal. In some examples, where first switching element 619 includes a transistor (e.g., MOSFET), storage element 608 may include an inductor connected between first switching element 619 and second switching element 620. In this example, voltage supply circuitry 604 may perform current sensing directly via first switching element 619. In some examples, voltage supply circuitry 604 may perform current sensing at an inductor of storage element 608 (e.g., using a Hall effect sensor). In some examples, capacitor 606 may be connected to reference supply pin 603 instead of positive supply pin 601.

Figure 7:
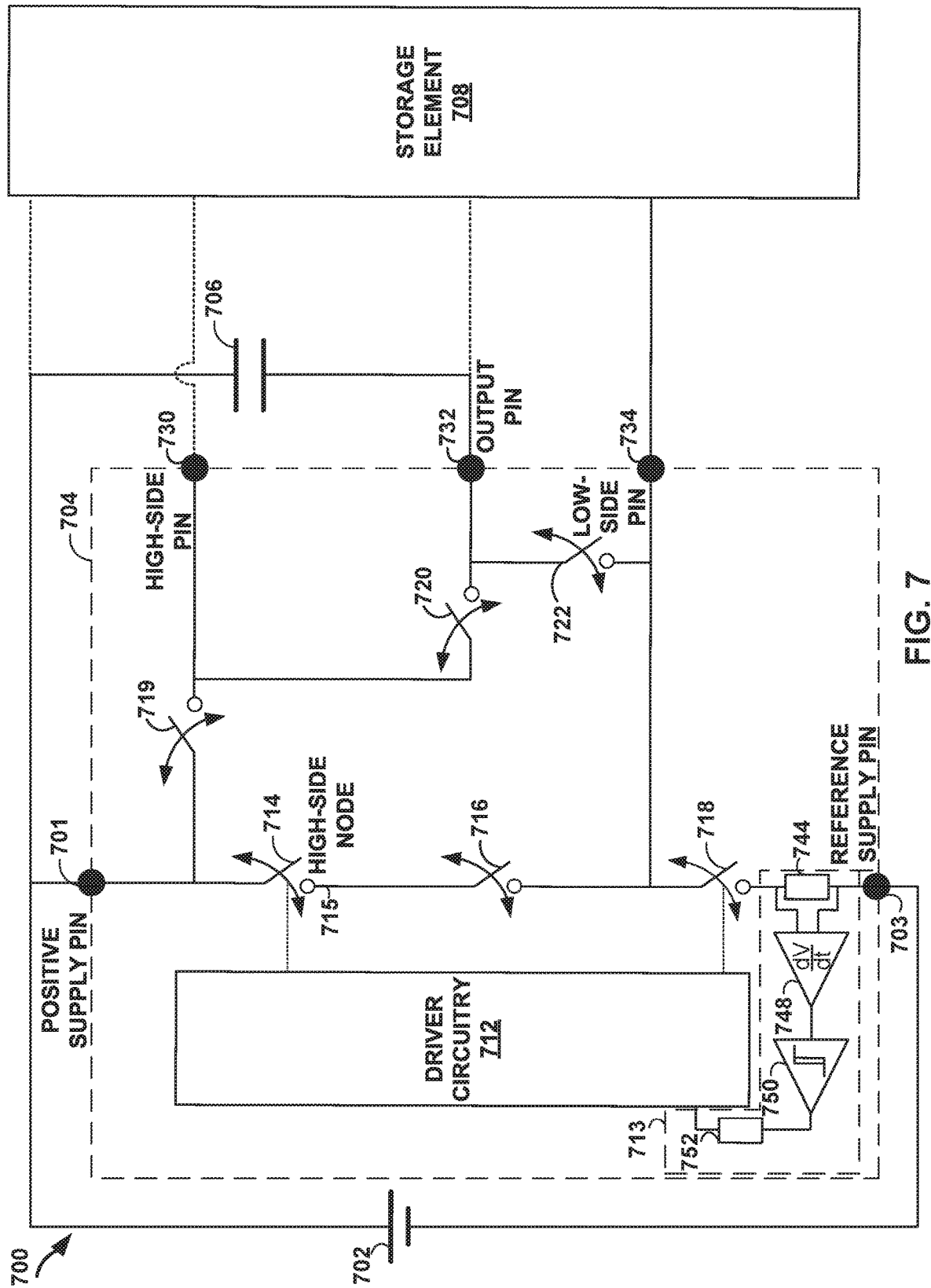
FIG. 7 is a conceptual diagram illustrating a sixth circuit for providing charge pump mode and boost converter mode functionality with first mode detection circuitry, in accordance with one or more techniques of this disclosure.

FIG. 7 is a conceptual diagram illustrating a sixth circuit 700 for providing charge pump mode and boost converter mode functionality with first mode detection circuitry, in accordance with one or more techniques of this disclosure. As shown, circuit 700 includes supply 702, voltage supply circuitry 704, capacitor 706, and storage element 708, which may be examples of supply 102, voltage supply circuitry 104, capacitor 106, and storage element 108, respectively, of FIG. 1. For example, voltage supply circuitry 704 may include positive supply pin 701, reference supply pin 703, high-side pin 730, low-side pin 734, output pin 732, high-side switching element 714, low-side switching element 718, first switching element 719, second switching element 720, third switching element 722, and driver circuitry 712, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 7 includes fourth switching element 716, however, in some examples, fourth switching element 716 may be omitted (e.g., high side node 715 is directly coupled to low-side pin 734).

Voltage supply circuitry 704 further includes mode detection circuitry 713. Mode detection circuitry 713 may be configured to determine when storage element 708 is arranged in a charge pump configuration with voltage supply circuitry 704. In some examples, mode detection circuitry 713 may be configured to determine when storage element 708 is arranged in a boost converter configuration with voltage supply circuitry 704. Mode detection circuitry 713 may be configured to output an indication to driver circuitry 712 indicating whether storage element 708 is arranged in the charge pump configuration or the boost converter configuration.

In the example of FIG. 7, mode detection circuitry 713 may include a rate of change module 748, comparator module 750, and resistor 744. As shown, resistor 744 is arranged in series with low-side switching element 718. Rate of change module 748 may be configured to determine a rate of change of current output to reference supply pin 703 from voltage supply circuitry 704. For example, rate of change module 748 determines a rate of change of current through low-side switching element 718 using voltage at resistor 744. Comparator module 750 determines whether rate of change of current through low-side switching element 718 exceeds a predetermined threshold (e.g., 0) to determine a slope direction (e.g., positive, negative, etc.) of current through low-side switching element 718.

Mode detection circuitry 713 may be configured to determine that storage element 708 is arranged in the charge pump configuration with voltage supply circuitry 704 when the rate of change is less than or equal to zero (e.g., not positive) and that storage element 708 is arranged in the boost converter configuration with voltage supply circuitry 704 when the rate of change is greater than zero (e.g., positive).

For example, comparator module 750 may generate an indication (e.g., logical '1', logical '0', etc.) of a positive slope direction (e.g., dv/dt>0) of current through low-side switching element 718 when storage element 708 is arranged in a boost converter configuration with voltage supply circuitry 704. Specifically, due, in part, to an inductor of storage element 708 when storage element 708 is arranged in the boost converter configuration with voltage supply circuitry 704, current flowing through resistor 744 (and low-side switching element 718) may increase over time after low-side switching element 718 is closed. As such, rate of change module 748 may be configured to generate an output indicating an increase of current flowing through resistor 744 (and low-side switching element 718) and comparator module 750 may be configured to generate the indication of a positive slope direction of current through low-side switching element 718 in response to the output from rate of change module 748.

Comparator module 750 may generate an indication (e.g., logical '0', logical '1', etc.) of a negative slope direction (e.g., dv/dt<0) of current through low-side switching element 718 when storage element 708 is arranged in a charge pump configuration with voltage supply circuitry 704. Specifically, due, in part, to a capacitor of storage element 708 when storage element 708 is arranged in the charge pump converter configuration with voltage supply circuitry 704, current flowing through resistor 744 (and low-side switching element 718) may be relatively high directly after switching-in low-side switching element 718 and will decrease in response to switching-in low-side switching element 718. As such, rate of change module 748 may be configured to generate an output indicating a decrease of current flowing through resistor 744 (and low-side switching element 718) and comparator module 750 may be configured to generate the indication of a negative slope direction (or non-positive slope direction) of current through low-side switching element 718 in response to the output from rate of change module 748. In some examples, the slope direction in response to switching-in low-side switching element 718 may correspond to zero in case of a current limitation or a completely charged capacitor.

Figure 8:
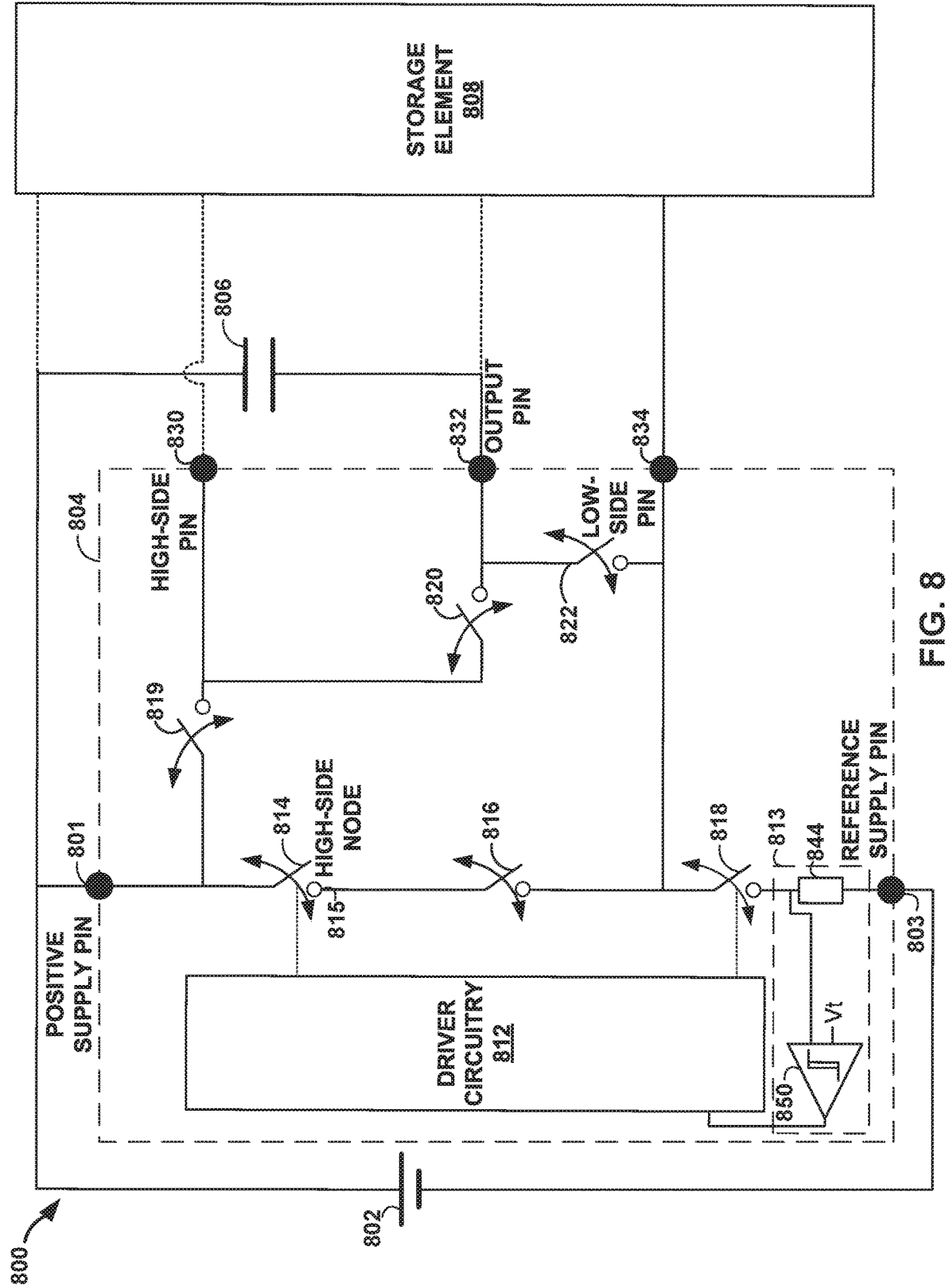
FIG. 8 is a conceptual diagram illustrating a seventh circuit for providing charge pump mode and boost converter mode functionality with second mode detection circuitry, in accordance with one or more techniques of this disclosure.

FIG. 8 is a conceptual diagram illustrating a seventh circuit 800 for providing charge pump mode and boost converter mode functionality with second mode detection circuitry, in accordance with one or more techniques of this disclosure. As shown, circuit 800 includes supply 802, voltage supply circuitry 804, capacitor 806, and storage element 808, which may be examples of supply 102, voltage supply circuitry 104, capacitor 106, and storage element 108, respectively, of FIG. 1. For example, voltage supply circuitry 804 may include positive supply pin 801, reference supply pin 803, high-side pin 830, low-side pin 834, output pin 832, high-side switching element 814, low-side switching element 818, first switching element 819, second switching element 820, third switching element 822, and driver circuitry 812, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 8 includes fourth switching element 816, however, in some examples, fourth switching element 816 may be omitted (e.g., high side node 815 is directly coupled to low-side pin 834).

Voltage supply circuitry 804 further includes mode detection circuitry 813. Mode detection circuitry 813 may be configured to determine when storage element 808 is arranged in a charge pump configuration with voltage supply circuitry 804. In some examples, mode detection circuitry 813 may be configured to determine when storage element 808 is arranged in a boost converter configuration with voltage supply circuitry 804. Mode detection circuitry 813 may be configured to output an indication to driver circuitry 812 indicating whether storage element 808 is arranged in the charge pump configuration or the boost converter configuration.

In the example of FIG. 8, mode detection circuitry 813 may include comparator module 850 and resistor 844. In this example, mode detection circuitry 813 omits a rate of change module. In this example, comparator module 850 may directly measure a voltage at resistor 844. In some examples, comparator module 850 may include a Schmitt trigger. For example, comparator module 850 may include hysteresis control.

Comparator module 850 may be configured to compare a magnitude of current output to reference supply pin 803 from voltage supply circuitry 804 and a threshold value. In this example, mode detection circuitry 813 may be configured to determine that storage element 808 is arranged in the charge pump configuration with voltage supply circuitry 804 in response to comparator module 850 outputting an indication that the magnitude of current is greater than the threshold value. In some examples, mode detection circuitry 813 may be configured to determine that storage element 808 is arranged in the boost converter configuration with voltage supply circuitry 804 in response to comparator module 850 outputting an indication that the magnitude of current is less than the threshold value.

Figure 9:
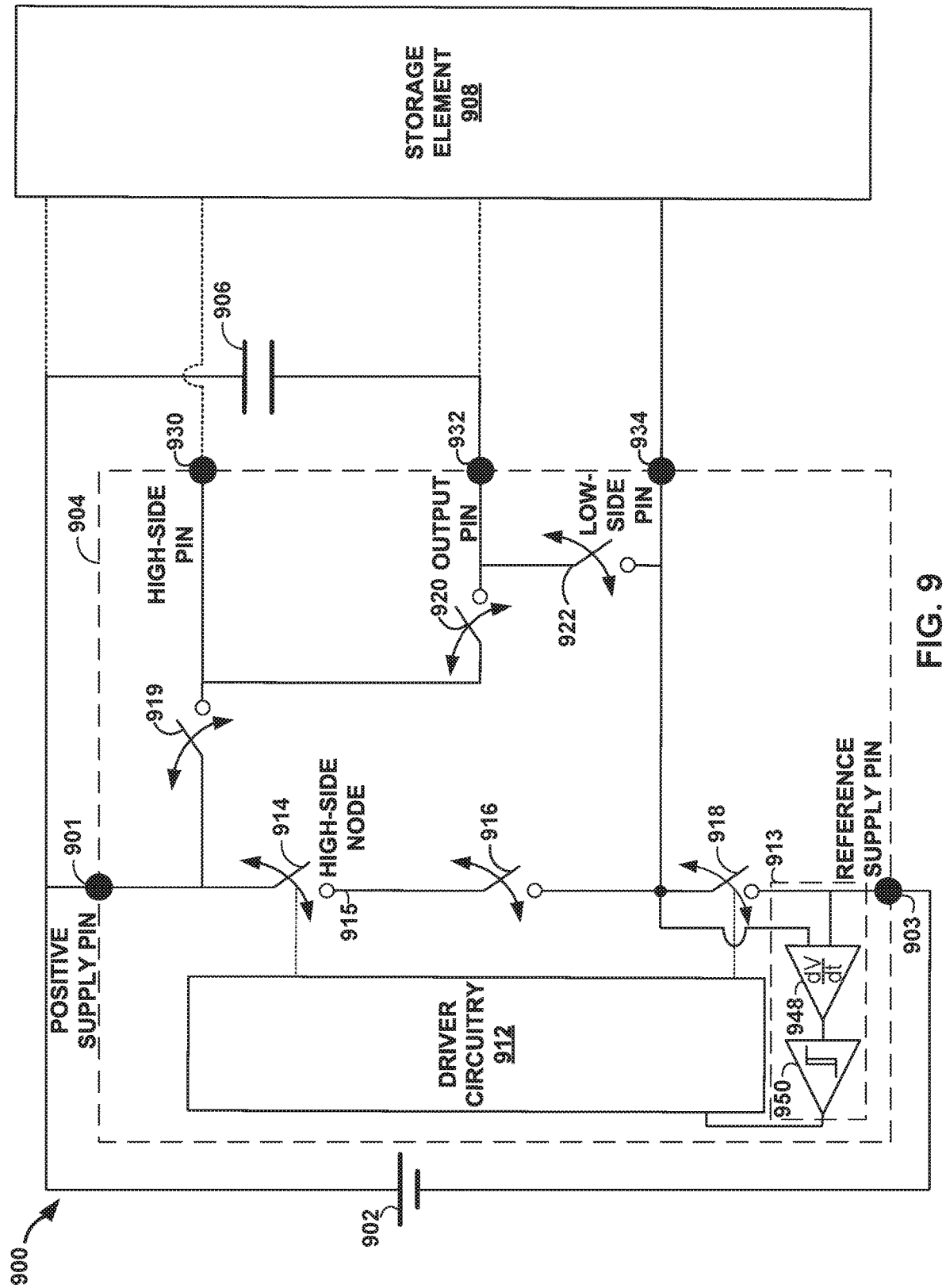
FIG. 9 is a conceptual diagram illustrating an eighth circuit for providing charge pump mode and boost converter mode functionality with third mode detection circuitry, in accordance with one or more techniques of this disclosure.

FIG. 9 is a conceptual diagram illustrating an eighth circuit for providing charge pump mode and boost converter mode functionality with third mode detection circuitry, in accordance with one or more techniques of this disclosure. As shown, circuit 900 includes supply 902, voltage supply circuitry 904, capacitor 906, and storage element 908, which may be examples of supply 102, voltage supply circuitry 104, capacitor 106, and storage element 108, respectively, of FIG. 1. For example, voltage supply circuitry 904 may include positive supply pin 901, reference supply pin 903, high-side pin 930, low-side pin 934, output pin 932, high-side switching element 914, low-side switching element 918, first switching element 919, second switching element 920, third switching element 922, and driver circuitry 912, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 9 includes fourth switching element 916, however, in some examples, fourth switching element 916 may be omitted (e.g., high side node 915 is directly coupled to low-side pin 934).

Voltage supply circuitry 904 further includes mode detection circuitry 913. Mode detection circuitry 913 may be configured to determine when storage element 908 is arranged in a charge pump configuration with voltage supply circuitry 904. In some examples, mode detection circuitry 913 may be configured to determine when storage element 908 is arranged in a boost converter configuration with voltage supply circuitry 904. Mode detection circuitry 913 may be configured to output an indication to driver circuitry 912 indicating whether storage element 908 is arranged in the charge pump configuration or the boost converter configuration.

In the example of FIG. 9, mode detection circuitry 913 may include a rate of change module 948 and comparator module 950. Rate of change module 948 may be configured to determine a rate of change of current output to reference supply pin 903 from voltage supply circuitry 904. For example, rate of change module 948 determines a rate of change of current through low-side switching element 918 using voltage at low-side switching element 918. Comparator module 950 determines whether rate of change of current through low-side switching element 918 exceeds a predetermined threshold (e.g., 0) to determine a slope direction of current through low-side switching element 918.

Mode detection circuitry 913 may be configured to determine that storage element 908 is arranged in the charge pump configuration with voltage supply circuitry 904 when the rate of change is less than or equal to zero (e.g., not positive) and that storage element 908 is arranged in the boost converter configuration with voltage supply circuitry 904 when the rate of change is greater than zero (e.g., positive).

Figure 10:
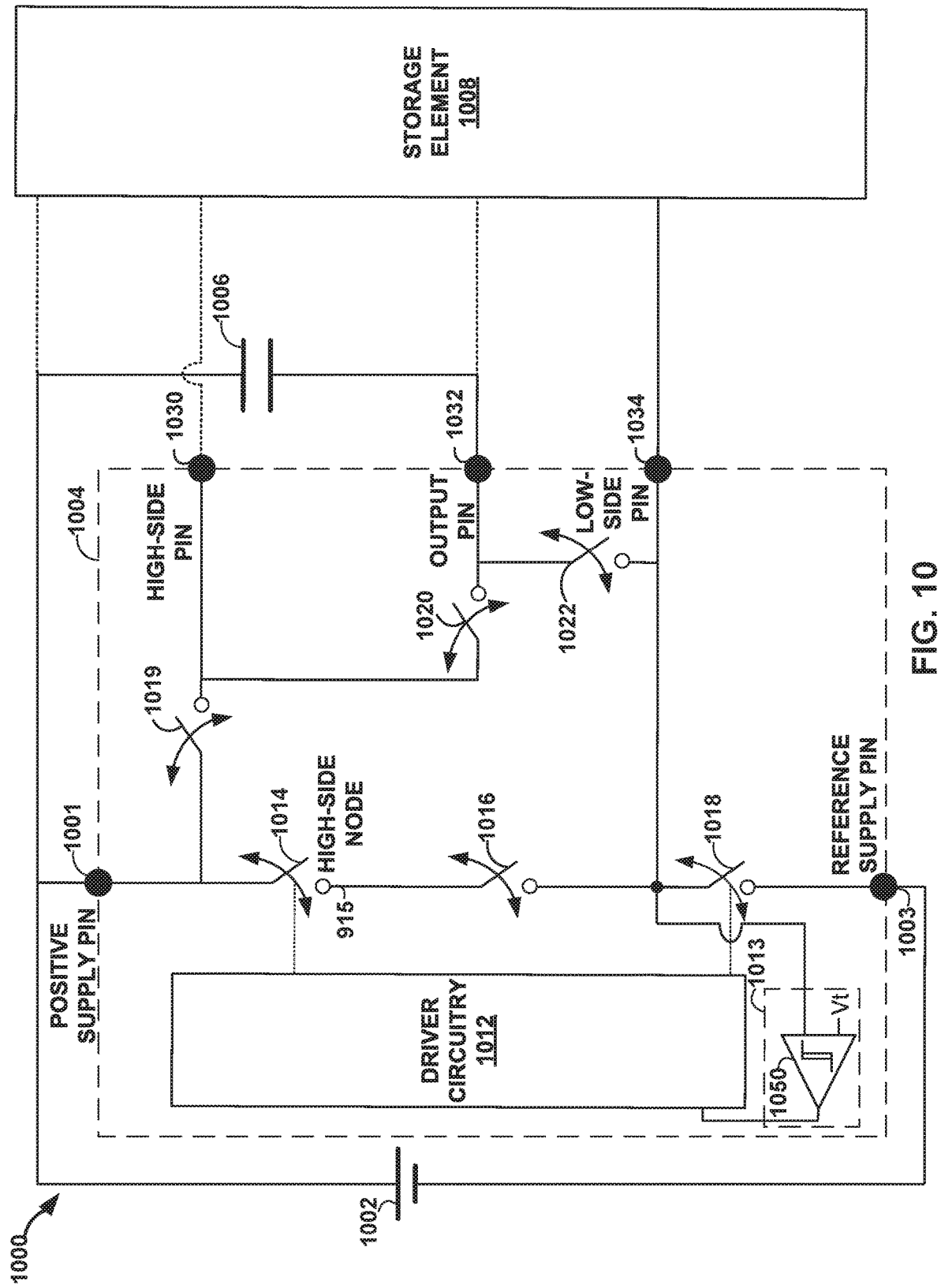
FIG. 10 is a conceptual diagram illustrating a ninth circuit for providing charge pump mode and boost converter mode functionality with fourth mode detection circuitry, in accordance with one or more techniques of this disclosure.

FIG. 10 is a conceptual diagram illustrating a ninth circuit 1000 for providing charge pump mode and boost converter mode functionality with fourth mode detection circuitry, in accordance with one or more techniques of this disclosure. As shown, circuit 1000 includes supply 1002, voltage supply circuitry 1004, capacitor 1006, and storage element 1008, which may be examples of supply 102, voltage supply circuitry 104, capacitor 106, and storage element 108, respectively, of FIG. 1. For example, voltage supply circuitry 1004 may include positive supply pin 1001, reference supply pin 1003, high-side pin 1030, low-side pin 1034, output pin 1032, high-side switching element 1014, low-side switching element 1018, first switching element 1019, second switching element 1020, third switching element 1022, and driver circuitry 1012, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 10 includes fourth switching element 1016, however, in some examples, fourth switching element 1016 may be omitted (e.g., high side node 1015 is directly coupled to low-side pin 1034).

Voltage supply circuitry 1004 further includes mode detection circuitry 1013. Mode detection circuitry 1013 may be configured to determine when storage element 1008 is arranged in a charge pump configuration with voltage supply circuitry 1004. In some examples, mode detection circuitry 1013 may be configured to determine when storage element 1008 is arranged in a boost converter configuration with voltage supply circuitry 1004. Mode detection circuitry 1013 may be configured to output an indication to driver circuitry 1012 indicating whether storage element 1008 is arranged in the charge pump configuration or the boost converter configuration.

In the example of FIG. 10, mode detection circuitry 1013 may include comparator module 1050. In this example, mode detection circuitry 1013 omits a rate of change module and a resistor. In this example, comparator module 1050 may directly measure voltage at low-side switching element 1018. In some examples, comparator module 1050 may include a Schmitt trigger. For example, comparator module 1050 may include hysteresis control.

Comparator module 1050 may be configured to compare a magnitude of current output to reference supply pin 1003 from voltage supply circuitry 1004 and a threshold value. In this example, mode detection circuitry 1013 may be configured to determine that storage element 1008 is arranged in the charge pump configuration with voltage supply circuitry 1004 in response to comparator module 1050 outputting an indication that the magnitude of current, as indicated by voltage at low-side switching element 1018, is greater than the threshold value. In some examples, mode detection circuitry 1013 may be configured to determine that storage element 1008 is arranged in the boost converter configuration with voltage supply circuitry 1004 in response to comparator module 1050 outputting an indication that the magnitude of current, as indicated by voltage at low-side switching element 1018, is less than the threshold value.

Figure 11:
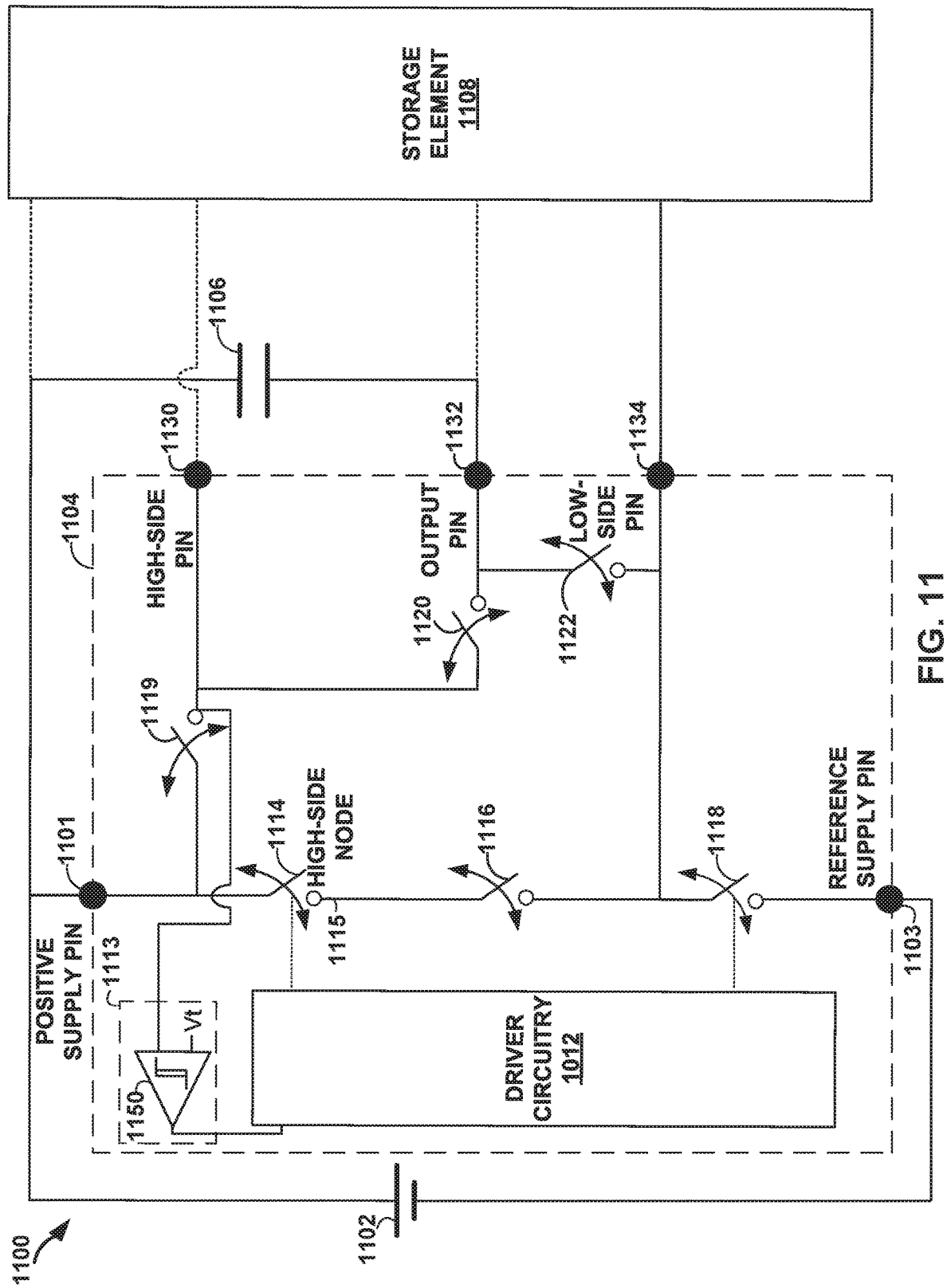
FIG. 11 is a conceptual diagram illustrating a tenth circuit for providing charge pump mode and boost converter mode functionality with fifth mode detection circuitry, in accordance with one or more techniques of this disclosure.

FIG. 11 is a conceptual diagram illustrating a tenth circuit 1100 for providing charge pump mode and boost converter mode functionality with fifth mode detection circuitry, in accordance with one or more techniques of this disclosure. As shown, circuit 1100 includes supply 1102, voltage supply circuitry 1104, capacitor 1106, and storage element 1108, which may be examples of supply 102, voltage supply circuitry 104, capacitor 106, and storage element 108, respectively, of FIG. 1. For example, voltage supply circuitry 1104 may include positive supply pin 1101, reference supply pin 1103, high-side pin 1130, low-side pin 1134, output pin 1132, high-side switching element 1114, low-side switching element 1118, first switching element 1119, second switching element 1120, third switching element 1122, and driver circuitry 1112, which may be examples of positive supply pin 111, reference supply pin 113, high-side pin 130, low-side pin 134, output pin 132, high-side switching element 114, low-side switching element 118, first switching element 119, second switching element 120, third switching element 122, and driver circuitry 112, respectively, of FIG. 1. The example of FIG. 11 includes fourth switching element 1116, however, in some examples, fourth switching element 1116 may be omitted (e.g., high side node 1115 is directly coupled to low-side pin 1134).

Voltage supply circuitry 1104 further includes mode detection circuitry 1113. Mode detection circuitry 1113 may be configured to determine when storage element 1108 is arranged in a charge pump configuration with voltage supply circuitry 1104. In some examples, mode detection circuitry 1113 may be configured to determine when storage element 1108 is arranged in a boost converter configuration with voltage supply circuitry 1104. Mode detection circuitry 1113 may be configured to output an indication to driver circuitry 1112 indicating whether storage element 1108 is arranged in the charge pump configuration or the boost converter configuration.

In the example of FIG. 11, mode detection circuitry 1113 may include comparator module 1150. In this example, comparator module 1150 may measure current at first switching element 1119. In some examples, comparator module 1150 may include a Schmitt trigger. For example, comparator module 1150 may include hysteresis control.

Comparator module 1150 may be configured to compare a magnitude of current at first switching element 1119 and a threshold value. In this example, mode detection circuitry 1113 may be configured to determine that storage element 1108 is arranged in the charge pump configuration with voltage supply circuitry 1104 in response to comparator module 1150 outputting an indication that the magnitude of current, as indicated by voltage at first switching element 1119, is greater than the threshold value (e.g., zero). For instance, when storage element 1108 is arranged in the charge pump configuration with voltage supply circuitry 1104, current pulses may flow through capacitor 1106. In some examples, mode detection circuitry 1113 may be configured to determine that storage element 1108 is arranged in the boost converter configuration with voltage supply circuitry 1104 in response to comparator module 1150 outputting an indication that the magnitude of current, as indicated by voltage at first switching element 1119, is less than the threshold value (e.g., zero). When storage element 1108 is arranged in the boost converter configuration with voltage supply circuitry 1104, there may not be current pulses flowing through capacitor 1106.

For example, mode detection circuitry 1113 may be configured to determine that storage element 1108 is arranged in the charge pump with voltage supply circuitry 1104 in response to comparator module 1150 outputting an indication that the magnitude of current is greater than zero and that storage element 1108 is arranged in the boost converter with voltage supply circuitry 1104 in response to comparator module 1150 outputting an indication that the magnitude of current is less than or equal to zero.

Figure 12:
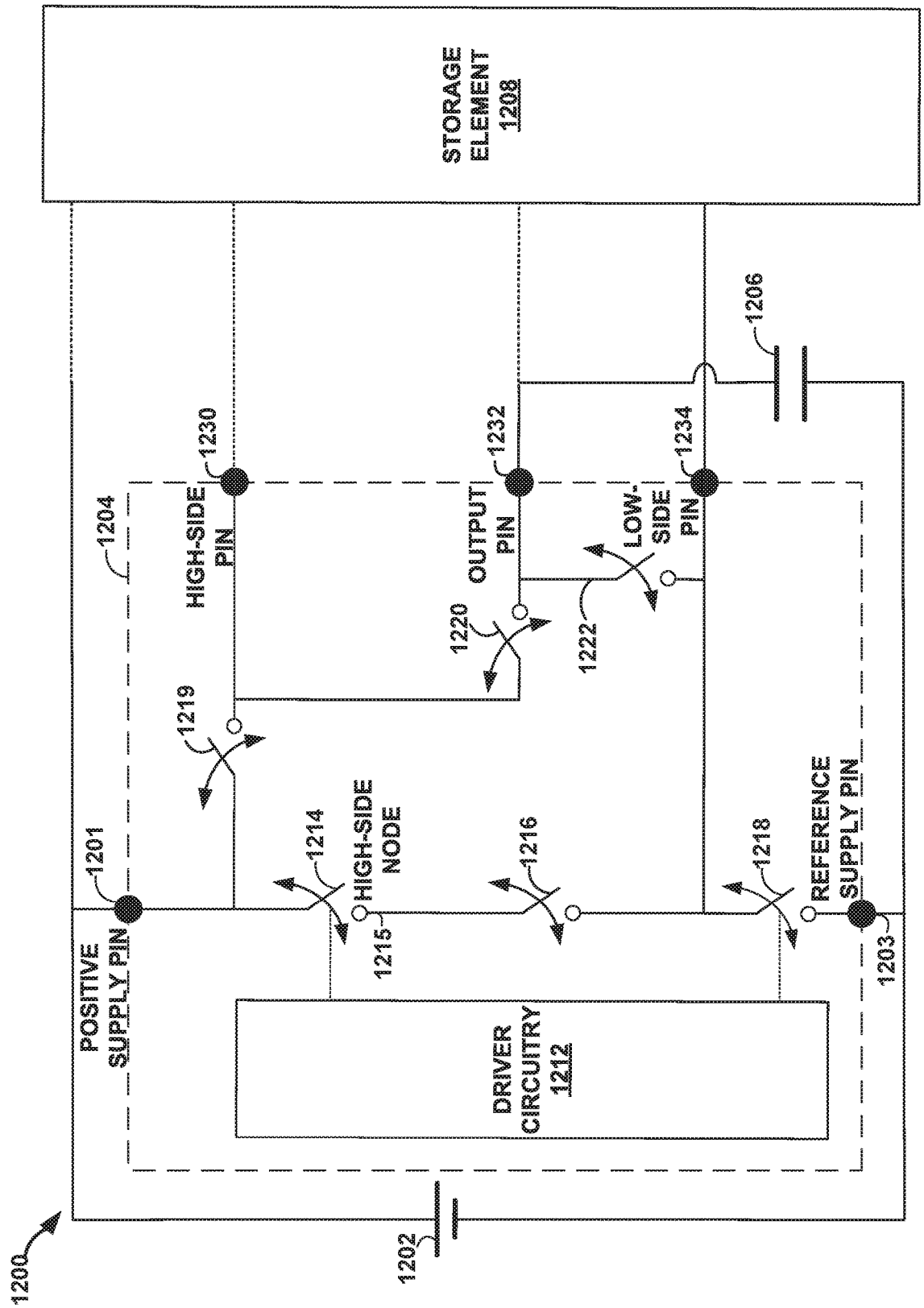
FIG. 12 is a conceptual diagram illustrating an eleventh circuit for providing charge pump mode and boost converter mode functionality with a capacitor arranged at an output pin, in accordance with one or more techniques of this disclosure.

FIG. 12 is a conceptual diagram illustrating an eleventh circuit 1200 for providing charge pump mode and boost converter mode functionality with a capacitor 1206 arranged at an output pin, in accordance with one or more techniques of this disclosure. As shown, circuit 1200 includes supply 1202, voltage supply circuitry 1204, capacitor 1206, and capacitor 1208, which may be examples of supply 102, voltage supply circuitry 104, capacitor 106, and storage element 108, respectively, of FIG. 1. For example, voltage supply circuitry 1204 may include positive supply pin 1201, reference supply pin 1203, high-side pin 1230, low-side pin 1234, output pin 1232, high-side switching element 1214, low-side switching element 1218, first switching element 1219, second switching element 1220, third switching element 1222, and driver circuitry 1212, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. In the example of FIG. 12, capacitor 1206 comprises a first node coupled to output pin 1232 and a second node coupled to reference supply pin 1203. The example of FIG. 12 includes fourth switching element 1216, however, in some examples, fourth switching element 1216 may be omitted (e.g., high side node 1215 is directly coupled to low-side pin 1234).

Figure 13:
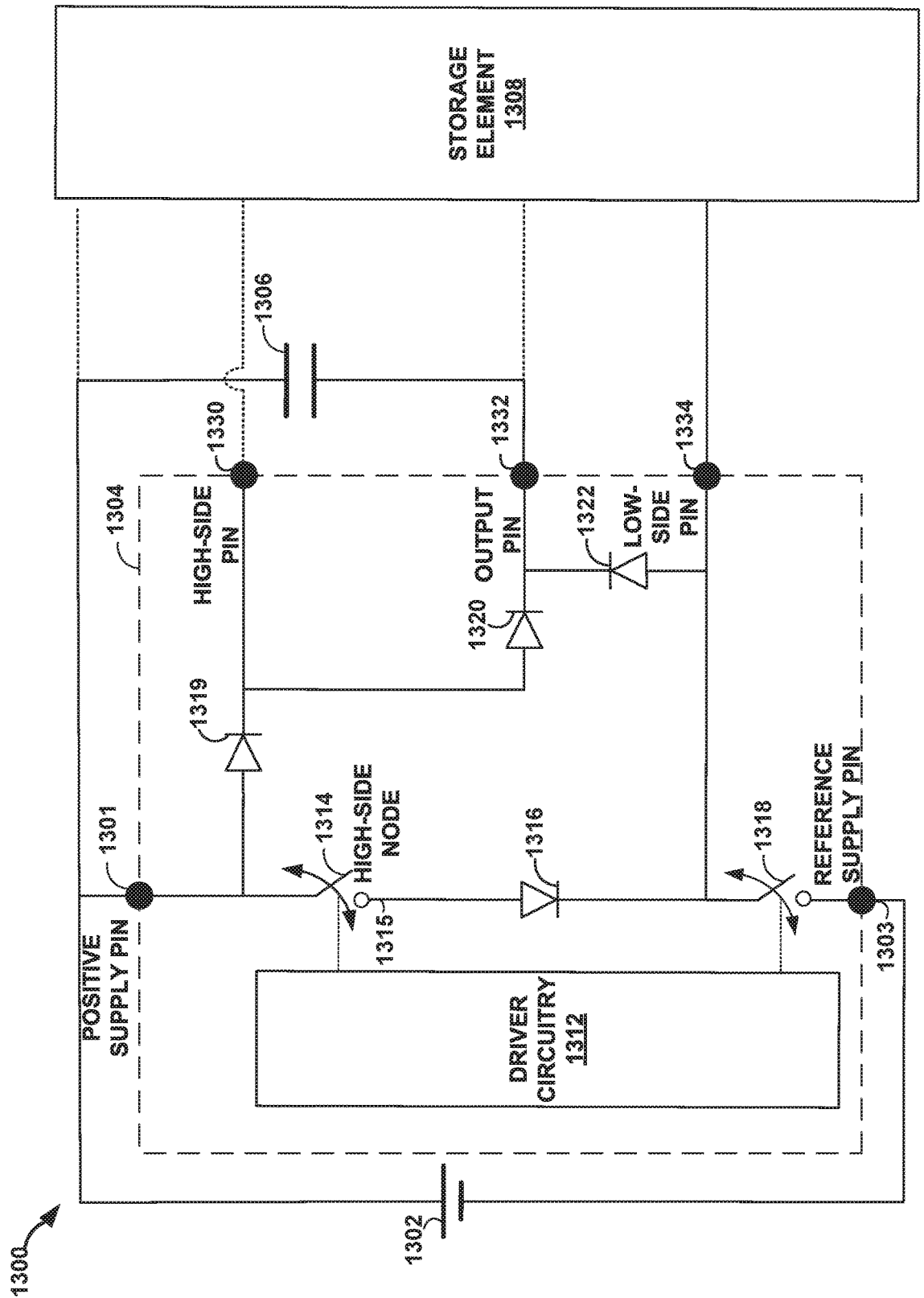
FIG. 13 is a conceptual diagram illustrating a twelfth circuit for providing charge pump mode and boost converter mode functionality using diodes, in accordance with one or more techniques of this disclosure.

FIG. 13 is a conceptual diagram illustrating a twelfth circuit 1300 for providing charge pump mode and boost converter mode functionality using diodes, in accordance with one or more techniques of this disclosure. As shown, circuit 1300 includes supply 1302, voltage supply circuitry 1304, capacitor 1306, and capacitor 1308, which may be examples of supply 102, voltage supply circuitry 104, capacitor 106, and storage element 108, respectively, of FIG. 1. For example, voltage supply circuitry 1304 may include positive supply pin 1301, reference supply pin 1303, high-side pin 1330, low-side pin 1334, output pin 1332, high-side switching element 1314, low-side switching element 1318, first diode 1319, second diode 1320, third diode 1322, and driver circuitry 1312, which may be examples of positive supply pin 101, reference supply pin 103, high-side pin 130, low-side pin 134, output pin 132, high-side switching element 114, low-side switching element 118, first switching element 119, second switching element 120, third switching element 122, and driver circuitry 112, respectively, of FIG. 1. In the example of FIG. 13, capacitor 1306 comprises a first node coupled to positive supply pin 1301 and a second node coupled to output pin 1332. In some examples, capacitor 1306 may comprise a first node coupled to output pin 1332 and a second node coupled to reference supply pin 1303. The example of FIG. 13 includes fourth switching element 1316, however, in some examples, fourth switching element 1316 may be omitted (e.g., high side node 1315 is directly coupled to low-side pin 1334).

As shown, first diode 1319 may include an anode coupled to positive supply pin 1301 and a cathode coupled to high-side pin 1330. Second diode 1320 may include an anode coupled to high-side pin 1330 and a cathode coupled to output pin 1332. Third diode 1322 may include an anode coupled to low-side pin 1334 and a cathode coupled to output pin 1332. Fourth diode 1316 may include an anode coupled to high-side node 1315 and a cathode coupled to low-side pin 1334.

The following examples may illustrate one or more aspects of the disclosure.

Example 1. Voltage supply circuitry comprising: a positive supply pin and a reference supply pin configured to couple to a supply; a high-side pin and a low-side pin configured to couple to a storage element; an output pin; a high-side switching element configured to electrically couple the positive supply pin and the low-side pin based on a high-side control signal; a low-side switching element configured to electrically couple the reference supply pin and the low-side pin based on a low-side control signal; a first switching element configured to electrically couple the positive supply pin and the high-side pin; a second switching element configured to electrically couple the high-side pin and the output pin; a third switching element configured to electrically couple the output pin and the low-side pin; and driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

Example 2. The voltage supply circuitry of example 1, wherein, in the charge pump configuration, the storage element comprises a capacitor including a first node coupled to the high-side pin and a second node coupled to the low-side pin.

Example 3. The voltage supply circuitry of any combination of examples 1-2, wherein, when operating in a first phase of the charge pump mode, the driver circuitry is configured to switch-out the high-side switching element and switch-in the low-side switching element such that the capacitor is charged by the supply.

Example 4. The controller circuit of any combination of examples 1-3, wherein the capacitor is a first capacitor; and wherein, when operating in a second phase of the charge pump mode, the driver circuitry is configured to switch-in the high-side switching element and switch-out the low-side switching element such that the first capacitor charges a second capacitor.

Example 5. The voltage supply circuitry of any combination of examples 1-4, wherein the second capacitor comprises a first node coupled to the positive supply pin and a second node coupled to the output pin; or wherein the second capacitor comprises a first node coupled to the output pin and a second node coupled to the reference supply pin.

Example 6. The voltage supply circuitry of any combination of examples 1-5, wherein, in the boost converter configuration, the storage element comprises an inductor.

Example 7. The voltage supply circuitry of any combination of examples 1-6, wherein, when operating in a first phase of the boost converter mode, the driver circuitry is configured to switch-out the high-side switching element and switch-in the low-side switching element such that the inductor is charged by the supply.

Example 8. The voltage supply circuitry of any combination of examples 1-7, wherein, when operating in a second phase of the boost converter mode, the driver circuitry is configured to switch-out the high-side switching element and switch-out the low-side switching element such that the inductor charges a capacitor.

Example 9. The voltage supply circuitry of any combination of examples 1-8, wherein the inductor comprises a first node coupled to the positive supply pin and a second node coupled to the low-side pin; or wherein the inductor comprises a first node coupled to the high-side pin and a second node coupled to the low-side pin.

Example 10. The voltage supply circuitry of any combination of examples 1-9, comprising one or more of: first current limiting circuitry configured to regulate current from the positive supply pin into high-side switching element; and second current limiting circuitry configured to regulate current output to the reference supply pin from the voltage supply circuitry.

Example 11. The voltage supply circuitry of any combination of examples 1-10, comprising current sensing circuitry configured to sense current output to the reference supply pin from the voltage supply circuitry, wherein the driver circuitry is configured to generate the low-side control signal based on the current output to the reference supply pin.

Example 12. The voltage supply circuitry of any combination of examples 1-11, comprising: mode detection circuitry configured to determine when the storage element is arranged in the charge pump configuration with the voltage supply circuitry and when the storage element is arranged in the boost converter configuration with the voltage supply circuitry and output an indication to the driver circuitry indicating whether the storage element is arranged in the charge pump configuration or the boost converter configuration.

Example 13. The voltage supply circuitry of any combination of examples 1-12, wherein the mode detection circuitry comprises: a rate of change module configured to determine a rate of change of current output to the reference supply pin from the voltage supply circuitry, wherein the mode detection circuitry is configured to determine that the storage element is arranged in the charge pump configuration with the voltage supply circuitry when the rate of change is less than or equal to zero and that the storage element is arranged in the boost converter configuration with the voltage supply circuitry when the rate of change is greater than zero.

Example 14. The voltage supply circuitry of any combination of examples 1-13, wherein the mode detection circuitry comprises: a comparator module configured to compare a magnitude of current output to the reference supply pin from the voltage supply circuitry and a threshold value, wherein the mode detection circuitry is configured to determine that the storage element is arranged in the charge pump configuration with the voltage supply circuitry in response to the comparator module outputting an indication that the magnitude of current is greater than the threshold value and that the storage element is arranged in the boost converter configuration with the voltage supply circuitry in response to the comparator module outputting an indication that the magnitude of current is less than the threshold value.

Example 15. The voltage supply circuitry of any combination of examples 1-14, wherein the mode detection circuitry comprises: a rate of change module configured to determine a rate of change of current at the low-side switching element, wherein the mode detection circuitry is configured to determine that the storage element is arranged in the charge pump configuration with the voltage supply circuitry when the rate of change is less than or equal to zero and that the storage element is arranged in the charge pump configuration with the voltage supply circuitry when the rate of change is greater than zero.

Example 16. The voltage supply circuitry of any combination of examples 1-15, wherein the mode detection circuitry comprises: a comparator module configured to compare a magnitude of current at the low-side switching element and a threshold value, wherein the mode detection circuitry is configured to determine that the storage element is arranged in the charge pump configuration with the voltage supply circuitry in response to the comparator module outputting an indication that the magnitude of current is greater than the threshold value and that the storage element is arranged in the boost converter configuration with the voltage supply circuitry in response to the comparator module outputting an indication that the magnitude of current is less than the threshold value.

Example 17. The voltage supply circuitry of any combination of examples 1-16, wherein the mode detection circuitry comprises: a comparator module configured to determine whether a magnitude of current at the first switching element is greater than a threshold value, wherein the mode detection circuitry is configured to determine that the storage element is arranged in the charge pump with the voltage supply circuitry in response to the comparator module outputting an indication that the magnitude of current is greater than the threshold value and that the storage element is arranged in the boost converter with the voltage supply circuitry in response to the comparator module outputting an indication that the magnitude of current is less than or equal to the threshold value.

Example 18. The voltage supply circuitry of any combination of examples 1-17, wherein one or more of: the first switching element comprises a first diode including an anode coupled to the positive supply pin and a cathode coupled to the high-side pin; the second switching element comprises a second diode including an anode coupled to the high-side pin and a cathode coupled to the output pin; and the third switching element comprises a third diode including an anode coupled to the low-side pin and a cathode coupled to the output pin.

Example 19. Voltage supply circuitry comprising: a positive supply pin and a reference supply pin configured to couple to a supply; a high-side pin and a low-side pin configured to couple to a storage element; an output pin; a high-side switching element configured to electrically couple the positive supply pin and a high-side node based on a high-side control signal; a low-side switching element configured to electrically couple the reference supply pin and the low-side pin based on a low-side control signal; a first switching element configured to electrically couple the positive supply pin and the high-side pin; a second switching element configured to electrically couple the high-side pin and the output pin; a third switching element configured to electrically couple the output pin and the low-side pin; a fourth switching element configured to electrically couple the high-side node and the low-side pin; and driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

Example 20. Voltage supply circuitry comprising: a positive supply pin and a reference supply pin configured to couple to a supply; a high-side pin and a low-side pin configured to couple to a storage element; an output pin; a high-side switching element configured to electrically couple the positive supply pin and a high-side node based on a high-side control signal; a low-side switching element configured to electrically couple the reference supply pin and the low-side pin based on a low-side control signal; a first diode comprising an anode coupled to the positive supply pin and a cathode coupled to the high-side pin; a second diode comprising an anode coupled to the high-side pin and a cathode coupled to the output pin; a third diode comprising an anode coupled to the low-side pin and a cathode coupled to the output pin; a fourth diode comprising an anode coupled to the high-side node and a cathode coupled to the low-side pin; and driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry.

Various aspects have been described in this disclosure. These and other aspects are within the scope of the following claims.

The invention claimed is:

1. Voltage supply circuitry comprising:
a positive supply pin and a reference supply pin configured to couple to a supply;
a high-side pin and a low-side pin configured to couple to a storage element;
an output pin;
a high-side switching element configured to electrically couple the positive supply pin and the low-side pin based on a high-side control signal;
a low-side switching element configured to electrically couple the reference supply pin and the low-side pin based on a low-side control signal;
a first switching element configured to electrically couple the positive supply pin and the high-side pin;
a second switching element configured to electrically couple the high-side pin and the output pin;
a third switching element configured to electrically couple the output pin and the low-side pin;
driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry; and
wherein the third switching element is configured to switch-in when operating in one or more phases of the boost converter mode and to switch-out when operating in the charge pump mode.

2. The voltage supply circuitry of claim 1, wherein, in the charge pump configuration, the storage element comprises a capacitor including a first node coupled to the high-side pin and a second node coupled to the low-side pin.

3. The voltage supply circuitry of claim 2, wherein, when operating in a first phase of the charge pump mode, the driver circuitry is configured to switch-out the high-side switching element and switch-in the low-side switching element such that the capacitor is charged by the supply.

4. The voltage supply circuitry of claim 3,
wherein the capacitor is a first capacitor; and
wherein, when operating in a second phase of the charge pump mode, the driver circuitry is configured to switch-in the high-side switching element and switch-out the low-side switching element such that the first capacitor charges a second capacitor.

5. The voltage supply circuitry of claim 4,
wherein the second capacitor comprises a first node coupled to the positive supply pin and a second node coupled to the output pin; or
wherein the second capacitor comprises a first node coupled to the output pin and a second node coupled to the reference supply pin.

6. The voltage supply circuitry of claim 1, wherein, in the boost converter configuration, the storage element comprises an inductor.

7. The voltage supply circuitry of claim 6, wherein, when operating in a first phase of the boost converter mode, the driver circuitry is configured to switch-out the high-side switching element and switch-in the low-side switching element such that the inductor is charged by the supply.

8. The voltage supply circuitry of claim 7, wherein, when operating in a second phase of the boost converter mode, the driver circuitry is configured to switch-out the high-side switching element and switch-out the low-side switching element such that the inductor charges a capacitor.

9. The voltage supply circuitry of claim 6,
wherein the inductor comprises a first node coupled to the positive supply pin and a second node coupled to the low-side pin; or
wherein the inductor comprises a first node coupled to the high-side pin and a second node coupled to the low-side pin.

10. The voltage supply circuitry of claim 1, comprising one or more of:
first current limiting circuitry configured to regulate current from the positive supply pin into high-side switching element; and second current limiting circuitry configured to regulate current output to the reference supply pin from the voltage supply circuitry.

11. The voltage supply circuitry of claim 1, comprising:
current sensing circuitry configured to sense current output to the reference supply pin from the voltage supply circuitry, wherein the driver circuitry is configured to generate the low-side control signal based on the current output to the reference supply pin.

12. The voltage supply circuitry of claim 1, comprising:
mode detection circuitry configured to determine when the storage element is arranged in the charge pump configuration with the voltage supply circuitry and when the storage element is arranged in the boost converter configuration with the voltage supply circuitry and output an indication to the driver circuitry indicating whether the storage element is arranged in the charge pump configuration or the boost converter configuration.

13. The voltage supply circuitry of claim 12, wherein the mode detection circuitry comprises:
a rate of change module configured to determine a rate of change of current output to the reference supply pin from the voltage supply circuitry, wherein the mode detection circuitry is configured to determine that the storage element is arranged in the charge pump configuration with the voltage supply circuitry when the rate of change is less than or equal to zero and that the storage element is arranged in the boost converter configuration with the voltage supply circuitry when the rate of change is greater than zero.

14. The voltage supply circuitry of claim 12, wherein the mode detection circuitry comprises:
a comparator module configured to compare a magnitude of current output to the reference supply pin from the voltage supply circuitry and a threshold value, wherein the mode detection circuitry is configured to determine that the storage element is arranged in the charge pump configuration with the voltage supply circuitry in response to the comparator module outputting an indication that the magnitude of current is greater than the threshold value and that the storage element is arranged in the boost converter configuration with the voltage supply circuitry in response to the comparator module outputting an indication that the magnitude of current is less than the threshold value.

15. The voltage supply circuitry of claim 12, wherein the mode detection circuitry comprises:
a rate of change module configured to determine a rate of change of current at the low-side switching element, wherein the mode detection circuitry is configured to determine that the storage element is arranged in the charge pump configuration with the voltage supply circuitry when the rate of change is less than or equal to zero and that the storage element is arranged in the boost converter configuration with the voltage supply circuitry when the rate of change is greater than zero.

16. The voltage supply circuitry of claim 12, wherein the mode detection circuitry comprises:
a comparator module configured to compare a magnitude of current at the low-side switching element and a threshold value, wherein the mode detection circuitry is configured to determine that the storage element is arranged in the charge pump configuration with the voltage supply circuitry in response to the comparator module outputting an indication that the magnitude of current is greater than the threshold value and that the storage element is arranged in the boost converter configuration with the voltage supply circuitry in response to the comparator module outputting an indication that the magnitude of current is less than the threshold value.

17. The voltage supply circuitry of claim 12, wherein the mode detection circuitry comprises:
a comparator module configured to determine whether a magnitude of current at the first switching element is greater than a threshold value, wherein the mode detection circuitry is configured to determine that the storage element is arranged in the charge pump with the voltage supply circuitry in response to the comparator module outputting an indication that the magnitude of current is greater than the threshold value and that the storage element is arranged in the boost converter with the voltage supply circuitry in response to the comparator module outputting an indication that the magnitude of current is less than or equal to the threshold value.

18. The voltage supply circuitry of claim 1, wherein one or more of:
the first switching element comprises a first diode including an anode coupled to the positive supply pin and a cathode coupled to the high-side pin;
the second switching element comprises a second diode including an anode coupled to the high-side pin and a cathode coupled to the output pin; and
the third switching element comprises a third diode including an anode coupled to the low-side pin and a cathode coupled to the output pin.

19. Voltage supply circuitry comprising:
a positive supply pin and a reference supply pin configured to couple to a supply;
a high-side pin and a low-side pin configured to couple to a storage element;
an output pin;
a high-side switching element configured to electrically couple the positive supply pin and a high-side node based on a high-side control signal;
a low-side switching element configured to electrically couple the reference supply pin and the low-side pin based on a low-side control signal;
a first switching element configured to electrically couple the positive supply pin and the high-side pin;
a second switching element configured to electrically couple the high-side pin and the output pin;
a third switching element configured to electrically couple the output pin and the low-side pin;
a fourth switching element configured to electrically couple the high-side node and the low-side pin;
driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry; and
wherein the third switching element is configured to switch-in when operating in one or more phases of the boost converter mode and to switch-out when operating in the charge pump mode.

20. Voltage supply circuitry comprising:
a positive supply pin and a reference supply pin configured to couple to a supply;

a high-side pin and a low-side pin configured to couple to a storage element; an output pin;

a high-side switching element configured to electrically couple the positive supply pin and a high-side node based on a high-side control signal;

a low-side switching element configured to electrically couple the reference supply pin and the low-side pin based on a low-side control signal;

a first diode comprising an anode coupled to the positive supply pin and a cathode coupled to the high-side pin;

a second diode comprising an anode coupled to the high-side pin and a cathode coupled to the output pin;

a third diode comprising an anode coupled to the low-side pin and a cathode coupled to the output pin;

a fourth diode comprising an anode coupled to the high-side node and a cathode coupled to the low-side pin;

driver circuitry configured to generate the high-side control signal and the low-side control signal for operating in a charge pump mode when the storage element is arranged in a charge pump configuration with the voltage supply circuitry and to generate the high-side control signal and the low-side control signal for operating in a boost converter mode when the storage element is arranged in a boost converter configuration with the voltage supply circuitry, and wherein the third diode is configured to switch-in when operating in one or more phases of the boost converter mode and to switch-out when operating in the charge pump mode.

* * * * *